US012612123B2

(12) United States Patent
Scruggs et al.

(10) Patent No.: US 12,612,123 B2
(45) Date of Patent: Apr. 28, 2026

(54) FIFTH WHEEL HITCH ENGAGEMENT SYSTEM

(71) Applicant: HORIZON GLOBAL AMERICAS INC., Plymouth, MI (US)

(72) Inventors: Mark Scruggs, Plymouth, MI (US); Curt Nowack, Plymouth, MI (US); Tom Stalder, Plymouth, MI (US); Gregoire Mercier, Plymouth, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 576 days.

(21) Appl. No.: 18/083,855

(22) Filed: Dec. 19, 2022

(65) Prior Publication Data

US 2023/0373257 A1      Nov. 23, 2023

Related U.S. Application Data

(63) Continuation of application No. 16/615,859, filed as application No. PCT/US2018/034110 on May 23, 2018, now Pat. No. 11,529,833.

(60) Provisional application No. 62/509,800, filed on May 23, 2017.

(51) Int. Cl.
  B60D 1/01       (2006.01)
  B62D 53/10      (2006.01)
(52) U.S. Cl.
  CPC ............. B60D 1/015 (2013.01); B62D 53/10 (2013.01)
(58) Field of Classification Search
  CPC ................................................... B62D 53/08
  USPC ................................................ 280/433, 437
  See application file for complete search history.

(56) References Cited

U.S. PATENT DOCUMENTS

| | | | | |
|---|---|---|---|---|
| 1,351,245 | A | 8/1920 | Hartwick | |
| 1,922,359 | A | 8/1933 | Edwards | |
| 2,423,743 | A | 7/1947 | Walther et al. | |
| 2,426,002 | A * | 8/1947 | Den Besten | ........... B62D 53/08 280/434 |
| 2,610,069 | A | 9/1952 | Ketel | |
| 2,784,984 | A | 3/1957 | Sherman | |
| 2,977,137 | A | 3/1961 | Durham | |
| 3,079,175 | A | 2/1963 | Walther | |
| 3,485,513 | A | 12/1969 | Walther | |
| 3,647,248 | A | 3/1972 | Ferris et al. | |
| 3,759,546 | A | 9/1973 | Slaven | |
| 3,787,076 | A | 1/1974 | Walther et al. | |
| 3,827,709 | A * | 8/1974 | Madura | ................. B62D 53/12 280/439 |
| 4,227,713 | A | 10/1980 | Blodgett et al. | |
| 4,447,070 | A * | 5/1984 | Inoue | .................... B62D 53/12 280/434 |

(Continued)

OTHER PUBLICATIONS

International Search Report and Written Opinion corresponding to Application No. PCT/US2018/034110, dated Jul. 30, 2018, 17 pages.

*Primary Examiner* — Kevin Hurley
(74) *Attorney, Agent, or Firm* — Day Pitney LLP; Christopher J. Head; Jacob J. Golan

(57)       ABSTRACT

A fifth wheel hitch assembly is shown and described. The fifth wheel hitch system may comprise a jaw fixed about a pivot pin and a biasing member biasing the jaw to a closed position. The fifth wheel hitch assembly may also include a kingpin guide positioned opposite the jaw, where the kingpin guide is adapted to engage and retain a kingpin against the jaw.

20 Claims, 17 Drawing Sheets

(56) References Cited

U.S. PATENT DOCUMENTS

| | | | |
|---|---|---|---|
| 4,455,036 A | 6/1984 | Barr | |
| 4,549,745 A | 10/1985 | Barr | |
| 4,566,715 A | 1/1986 | Buckley | |
| 4,946,183 A | 8/1990 | Benson et al. | |
| 5,516,138 A | 5/1996 | Fontaine | |
| 6,352,277 B1 | 3/2002 | Timmings | |
| 7,475,899 B2 | 1/2009 | Crawley | |
| 8,851,501 B2 * | 10/2014 | Keatley | B60D 1/015 |
| | | | 280/436 |
| 9,102,371 B2 | 8/2015 | Keatley | |
| 2007/0194555 A1 | 8/2007 | Roberts et al. | |
| 2010/0084836 A1 | 4/2010 | Cockram et al. | |
| 2015/0225028 A1 | 8/2015 | Alldredge et al. | |

* cited by examiner

FIFTH WHEEL HITCH ENGAGEMENT SYSTEM

CROSS-REFERENCE TO RELATED APPLICATIONS

This application is a continuation of U.S. patent application Ser. No. 16/615,859 filed on Nov. 22, 2019 and entitled, "FIFTH WHEEL HITCH ENGAGEMENT SYSTEM," which is a national phase filing of International Patent Application No. PCT/US2018/034110 filed May 23, 2018, which claims priority to U.S. Patent Application No. 62/509,800, filed on May 23, 2017, each of which is incorporated herein by reference in their entireties.

TECHNICAL FIELD

The present invention relates generally to a fifth wheel hitch assembly, and more particularly, to a fifth wheel hitch assembly comprising a kingpin engagement device.

BACKGROUND

Fifth wheel hitches are used with a towing vehicle, such as a pick-up truck, to engage a towed vehicle for towing. In this context, the fifth wheel hitches involve universal products that are typically operated by untrained operators, and may be configured to connect trailers to pickup trucks for a load range of about 7,000 lbs. up to about 32,000 lbs. or even more. Current fifth wheel hitches give limited to no feedback to the operator. Operators have to rely on visual feedback to determine the state of the coupling, which offers certain challenges.

Additionally, these types of connections are prone to giving secondary load feedback through the towing vehicle occupants either in single, repeatable or oscillatory manner. Over the years, various products have been developed to resolve the issue. These, however, resulted in either trading noise for comfort or other customer dissatisfaction factors. Current fifth wheel hitches are limited in their flexibility. If the customers buy a new or different towing vehicle, there may not be an option to transfer the fifth wheel to the different towing vehicle unless the mounting system is identical. The proliferation of non-standard under bed structures means that these parts are becoming more and more application specific.

In view of these shortcomings, there is a need for an improved fifth wheel hitch to overcome the afore-mentioned shortcomings.

SUMMARY

An exemplary embodiment of a fifth wheel hitch system may comprise a jaw fixed about a pivot pin and a biasing member biasing the jaw to a closed position. The fifth wheel hitch system may also comprise a kingpin guide positioned opposite the jaw, wherein the kingpin guide is adapted to engage and retain a kingpin against the jaw. The fifth wheel hitch may comprise any of the foregoing in any combination. For the sake of brevity, however, not every combination of each of the features below is described but every combination is contemplated hereby.

In the fifth wheel hitch system the kingpin guide may comprise a first flange portion, and a second flange portion.

The fifth wheel hitch system may comprise a head, where the first flange portion is attached to the head and the second flange portion is adapted to engage a minor diameter of the kingpin.

In the fifth wheel hitch system the kingpin guide may further comprise a longitudinal portion positioned between the first and second flange portions.

In the fifth wheel hitch system the kingpin guide may provide visual notice of the kingpin being operatively engaged with the jaw.

In the fifth wheel hitch system the first flange portion may provide visual notice of the kingpin being operatively engaged with the jaw.

In the fifth wheel hitch system the kingpin guide may prevent the jaw from closing when the kingpin is not in a lockable position relative to the jaw.

An exemplary embodiment of a fifth wheel hitch system may comprise a head having a throat portion and an arm fixed about a pivot point, a portion of the arm extending into the throat portion. The fifth wheel hitch system may also comprise an indicator arm operatively secured with the arm, where engagement of the arm by a kingpin pivots the arm about the pivot point rotating the indicator arm from a first position to a second position.

The fifth wheel hitch system may further comprise an indicator face attached with the indicator arm.

The fifth wheel hitch system may further comprise a window positioned in the head, only a portion of the indicator face viewable through the window.

In the fifth wheel hitch system the indicator face may comprise two sensor states.

The fifth wheel hitch system may further comprise a jaw fixed about a pivot pin and a kingpin guide positioned opposite the jaw, where the kingpin guide is adapted to engage and retain a kingpin against the jaw.

The fifth wheel hitch system may further comprise a handle pivotally attached to the head.

the wheel hitch system may further comprise a guide slot positioned in the handle where the guide slot permits movement of the handle along a predefined path.

In the fifth wheel hitch system the jaw and handle may be biased towards coupled position relative to a kingpin.

An exemplary embodiment of a fifth wheel hitch system may comprise a head having a throat portion, a jaw fixed about a pivot pin and a biasing member biasing the jaw to a closed position, where a portion of the jaw is positioned in the throat portion. The fifth wheel hitch system may also comprise a kingpin guide positioned opposite the jaw, where the kingpin guide is adapted to engage and retain a kingpin against the jaw, an arm fixed about a pivot point, a portion of the arm extending into the throat portion and an indicator arm operatively secured with the arm, wherein engagement of the arm by a kingpin pivots the arm about the pivot point rotating the indicator arm from a first position to a second position.

In the fifth wheel hitch system the indicator arm may comprise an indicator face having two sensor states.

The fifth wheel hitch may further comprise a handle pivotally attached with the head and a handle lockout selectively engageable with the handle.

In the fifth wheel hitch system, upon fully insertion of a kingpin the handle lockout holds the handle in a rotated position, keeping the jaw clear from the throat portion.

In the fifth wheel hitch system the handle lockout may be disengageable from the handle allowing biasing of the jaw and handle to rotate the handle and jaw towards a coupled position.

BRIEF DESCRIPTION OF THE DRAWINGS

Operation of the present teachings may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein. In the drawings.

DETAILED DESCRIPTION

Figure 1:
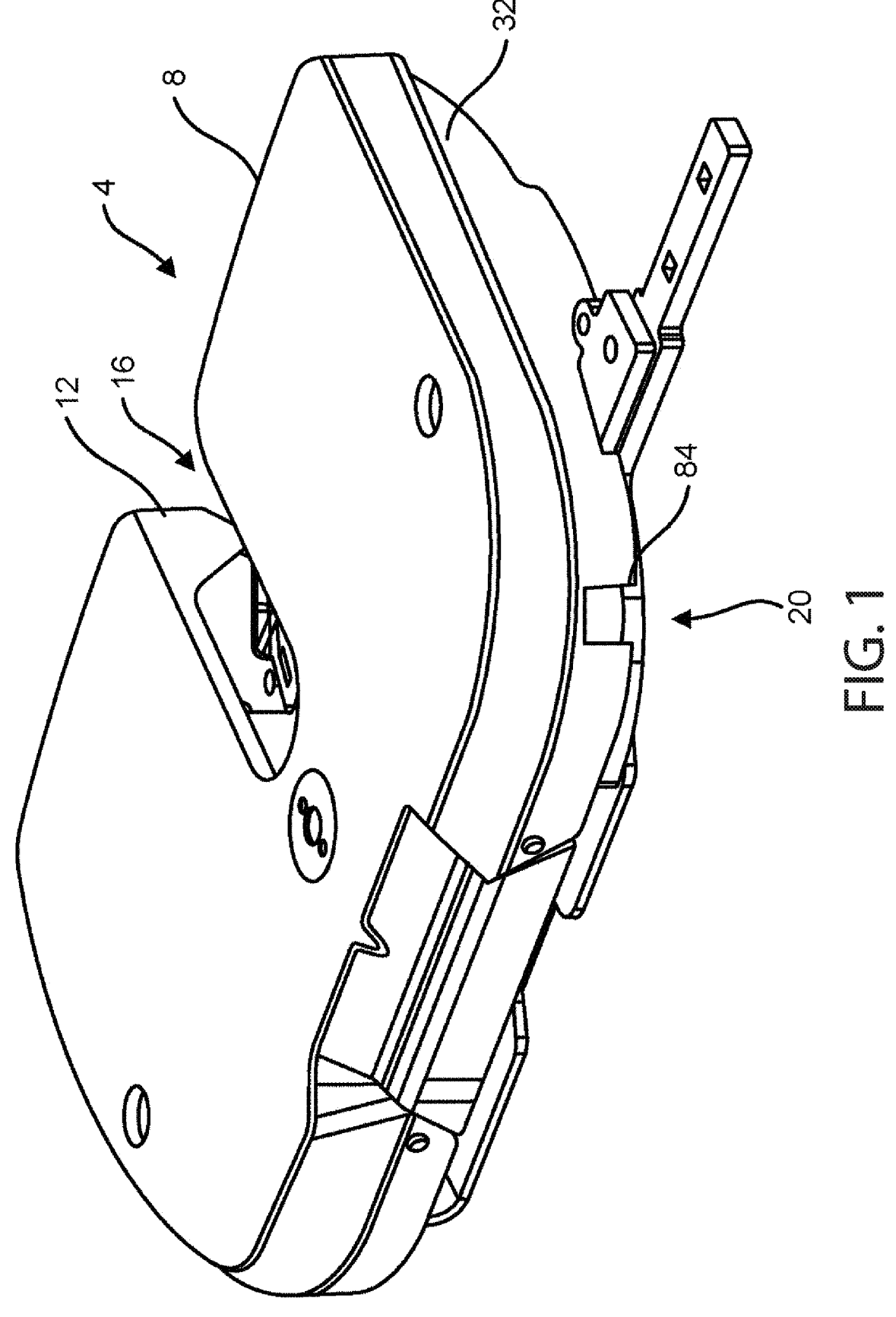
FIG. 1 is a perspective view of a fifth wheel hitch system of the present teachings.

Reference will now be made in detail to exemplary embodiments of the present disclosure, examples of which are illustrated in the accompanying drawings. It is to be understood that other embodiments may be utilized and structural and functional changes may be made without departing from the respective scope of this disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

The terminology used herein is for the purpose of describing particular embodiments only and is not intended to be limiting of the fifth wheel hitch system. As used herein, the singular forms "a," "an" and "the" are intended to include the plural forms as well, unless the context clearly indicates otherwise. Additionally, to the extent that the terms "including," "includes," "having," "has," "with," or variants thereof are used in either the detailed description and/or the claims, such terms are intended to be inclusive in a manner similar to the term "comprising." Furthermore, relative terms such as "lower," "upper," "horizontal," "vertical," "over" "above," "below," "up," "down," "top" and "bottom" as well as derivatives thereof (e.g., "downwardly," "upwardly," etc.) should be construed to refer to the orientation as then described or as shown in the drawing under discussion. These relative terms are for convenience of description and do not require that the fifth wheel hitch system be constructed or used in a particular orientation.

It is noted that the various embodiments described herein may include other components and/or functionality. It is further noted that while various embodiments refer to a fifth wheel hitch and kingpin engagement, various other systems may be utilized in view of embodiments described herein. Further, the present system may include a variety of components, not limited to the components discussed below. Optionally, the present system may include multiple units of the same components. In an embodiment, the present system may include just the fifth wheel hitch described herein. Further, the present system may include components of each of the fifth wheel hitch and kingpin to create a combination of each feature of the various systems.

A fifth wheel hitch system 4 of the embodiments described herein is shown in FIG. 1. The fifth wheel hitch system 4 may include a skid plate cover 8 of any appropriate configuration. The present teachings are not limited to only the skid plate cover 8 shown, all variations thereof are contemplated hereby. The fifth wheel hitch system 4 and skid plate cover 8 may include a throat portion 12. The throat portion 12 may be configured to accept a corresponding kingpin from a towed vehicle, e.g., a trailer. The kingpin may enter the throat portion 12 upon movement of either of the towing vehicle or towed vehicle whereby the fifth wheel hitch system 4 comes into operative communication with the kingpin of the trailer or towed vehicle.

The fifth wheel hitch system 4 may also include an engagement assembly 16 and/or an indicator system 20 as described in more detail herein. Some embodiments of the fifth wheel hitch system 4 may include both the engagement assembly 16 and the indicator system 20. Other embodiments may include just the engagement assembly 16 (without the indicator system 20) and still other embodiments may include just the indicator system 20 (without the engagement assembly 16).

Figure 2:
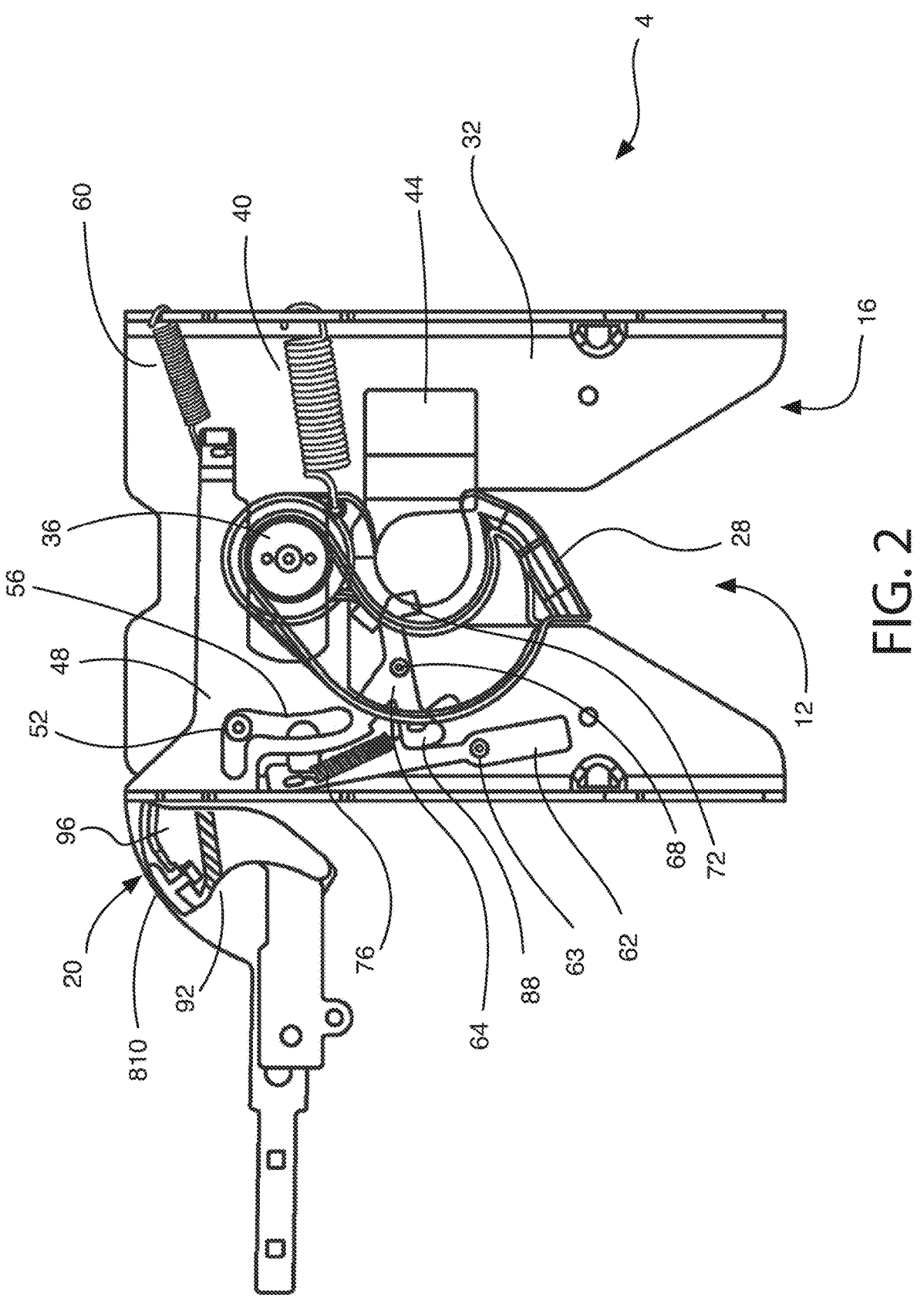
FIG. 2 is a sectional top view of a fifth wheel hitch system of the present teachings.

An exemplary fifth wheel hitch system 4 shown in more detail in FIG. 2 may include the engagement assembly 16 and the indicator system 20. In these embodiments, the fifth wheel hitch system 4 may include a jaw 28 (which is shown transparent in FIG. 2). The jaw 28 may be of any appropriate configuration and is not limited to the single jaw 28 shown. One or more jaw components may be utilized without departing from the present teachings. The jaw 28 may be fixed to a fifth wheel hitch head 32. For example, the jaw 28 may be fixed to the fifth wheel hitch head 32 such as through a pivot pin 36. The pivot pin 36 may be of any configuration that will permit the jaw 28 to pivot relative to the fifth wheel hitch head 32. The jaw 28 may extend into the throat portion 12 such as when it is in an engaged position such as that shown in FIG. 2. A jaw biasing member 40 may be attached between the fifth wheel hitch head 32 and the jaw 28. In an exemplary embodiment, the jaw biasing member 40 may comprise a spring (such as a coil spring) whereby one end is attached to the fifth wheel hitch head 32 and another end thereof is attached to the jaw 28. The jaw biasing member 40 may bias the jaw 28 into the throat portion 12 such that it is the engaged position. That is the jaw biasing member 40 biases the jaw 28 into the engaged position.

The engagement assembly 16 may include a kingpin guiding member 44, which is a rigid member position opposite the jaw 28. The kingpin guiding member 44 may provide a rigid surface for a minor diameter of a kingpin to contact as is described in more detail below.

The fifth wheel hitch system 4 may further include a handle 48. The handle 48 may be of any appropriate configuration and is not limited to the configuration shown. The handle 48 may be secured to the fifth wheel hitch head 32 via a guide bolt 52 that extends through a guide slot 56 positioned in the handle 48. The guide bolt 52 may act as a guide for the handle 48. That is as the handle 48 is moved such as between engaged or disengaged (locked or unlocked) positions, the guide bolt 52 and guide slot 56 permits movement along a predefined path so that the handle 48 may engage and disengage the fifth wheel hitch system 4 or more particularly, the jaw 28 as appropriate.

A handle biasing member 60 may be attached to the handle 48 and may bias the handle 48 to a fully engaged position, such as that shown in FIG. 2. In some embodiments, the handle biasing member 60 may comprise a spring. In such embodiments, one end of the handle biasing member 60 or spring may be attached to the fifth wheel hitch head 32 and another end may be attached to the handle 48 such as shown in FIG. 2. The biasing member 60 may be attached in any appropriate matter such as through hooks or the like.

The fifth wheel hitch system 4 may include a handle lockout member 62. The handle lockout member 62 is capable of rotating to engage the handle 48 in a defined position to prevent further rotation, pivoting or movement of the handle 48. The handle lockout member 62 may take any appropriate configuration and is not limited to that shown and described herein. The handle lockout member 62 may be attached to the fifth wheel hitch head 32 in any appropriate manner, such as through a pin 63 as shown in FIG. 2, which may allow the lockout member 62 to rotate to engage the handle 48.

The fifth wheel hitch system 4 may include a kingpin detector member 64 such as that shown in FIG. 2. The kingpin detector member 64 may include an arm 68 and an engagement portion 72 that may extend into the throat portion 12. The kingpin detector member 64 may be operatively engaged with the handle 48, the handle lockout member 62 such as shown in FIG. 2. A biasing member 76 may be attached to the kingpin detector member 64 and the handle lockout member 62. In an exemplary embodiment, the biasing member 76 may comprise a spring whereby one end of the spring is attached to the handle lockout member 62 and a second end thereof is attached to the kingpin detector member 64. The biasing member 76 may bias the kingpin detector member 64, or more specifically, the engagement portion 72 into the throat portion 12.

As shown in FIG. 2, the indicator system 20 may be rotationally attached to the fifth wheel hitch head 32 such that it can rotate about a central pivot. The indicator system 20 may include two distinct colors on one face, e.g., red and green, and may interact with the handle 48. An indicator system biasing member 92, such as the spring shown, may be attached to the indicator system 20. The indicator system biasing member 92 may bias the indicator system 20 toward one direction of rotation. Further a window 84 may be formed in the skid plate cover 8 or the fifth wheel hitch head 32 or both to allow a defined area of the indicator face to be visible to the user, e.g., one of the red or green face only. An exemplary embodiment of the window 84 is shown in FIG. 1. In operation, the jaw 28 may have parallel vertical service around pivot pin 36 or a pivot area that allows for the handle 48 to engage and constrain its rotational movement. Further, the kingpin guiding member 44 constrains movement of the kingpin when the jaw 28 does not extend, which is described in more detail below. The kingpin guiding member 44 also prevents the kingpin from being lowered past the jaw 28 and may prevent a possible high pinning situation from occurring.

The kingpin detector member 64 extends into the throat portion 12. The arm 68 engages the handle 48 positioning it to engage the jaw 28 so it can move freely. The jaw 28 may include an angle on its front side that may allow the kingpin to move it clear of the throat portion 12 and allow for coupling when in this position. For example, when a kingpin enters the throat portion 12 it pushes the jaw 28 out of the way and then rotates the kingpin detector member 64 until fully inserted. When the kingpin is fully inserted, the jaw 28 wraps around it, coupling the fifth wheel hitch system 4 to the kingpin. The arm 68 of the kingpin detector member 64 may disengage the handle 48 allowing the force from the handle spring 60 to pull the handle 48 toward the jaw 28. This may secure the jaws 28 rotational movement in the closed position. When uncoupling, disengaging or unlocking, the handle 48 may be pulled out and rotated towards the front of the towing vehicle (not shown), following the guide slot 56. When the kingpin is fully inserted, meaning the kingpin detector member 64 is rotated, the handle lockout member 62 is able to hold the handle 48 in the rotated position, keeping the jaw 48 clear from the throat portion 12. This may allow the kingpin to uncouple, disengage or unlock.

When the kingpin uncouples, the kingpin detector member 64 or more specifically, the engagement portion 72, rotates out into the throat portion 12. A second portion 88 of the arm 68 or a second arm 88 attached to the arm 68 may contact the handle lockout member 62 disengaging it from the handle 48. This may allow the spring bias of the jaw 28 and handle 48 along with the guide slot 56 to rotate the handle 48 and jaw 28 towards the engaged, coupled or locked position. The arm 68 of the kingpin detector member 64 may engage the handle 48 positioning the handle 48 to engage the jaw 28 so it can move freely.

The indicator 20 may be on a pivot with an indicator biasing member 92 or spring biasing the indicator's 20 rotation to only show red out of the window 84. The indicator 20 may include an indicator arm 96 attached with the indicator biasing member 92 in any appropriate manner. When the handle 48 is not fully engaged with the jaw 28, this may be a default position for the fifth wheel hitch system 4. When the handle 48 engages with the jaw 28 (i.e., a closed, locked or engaged position) it may also rotate the indicator 20 or more specifically, the indicator arm 96. When fully engaged, the indicator 20 or more specifically, the indicator arm 96 is rotated so that green is the only color shown through the window 84. Further, the window 84 may be positioned on the fifth wheel hitch system 4 so that it can be visible from a cab of the towing vehicle, along a side of the load bed of the towing vehicle, or from both positions.

Figure 3:
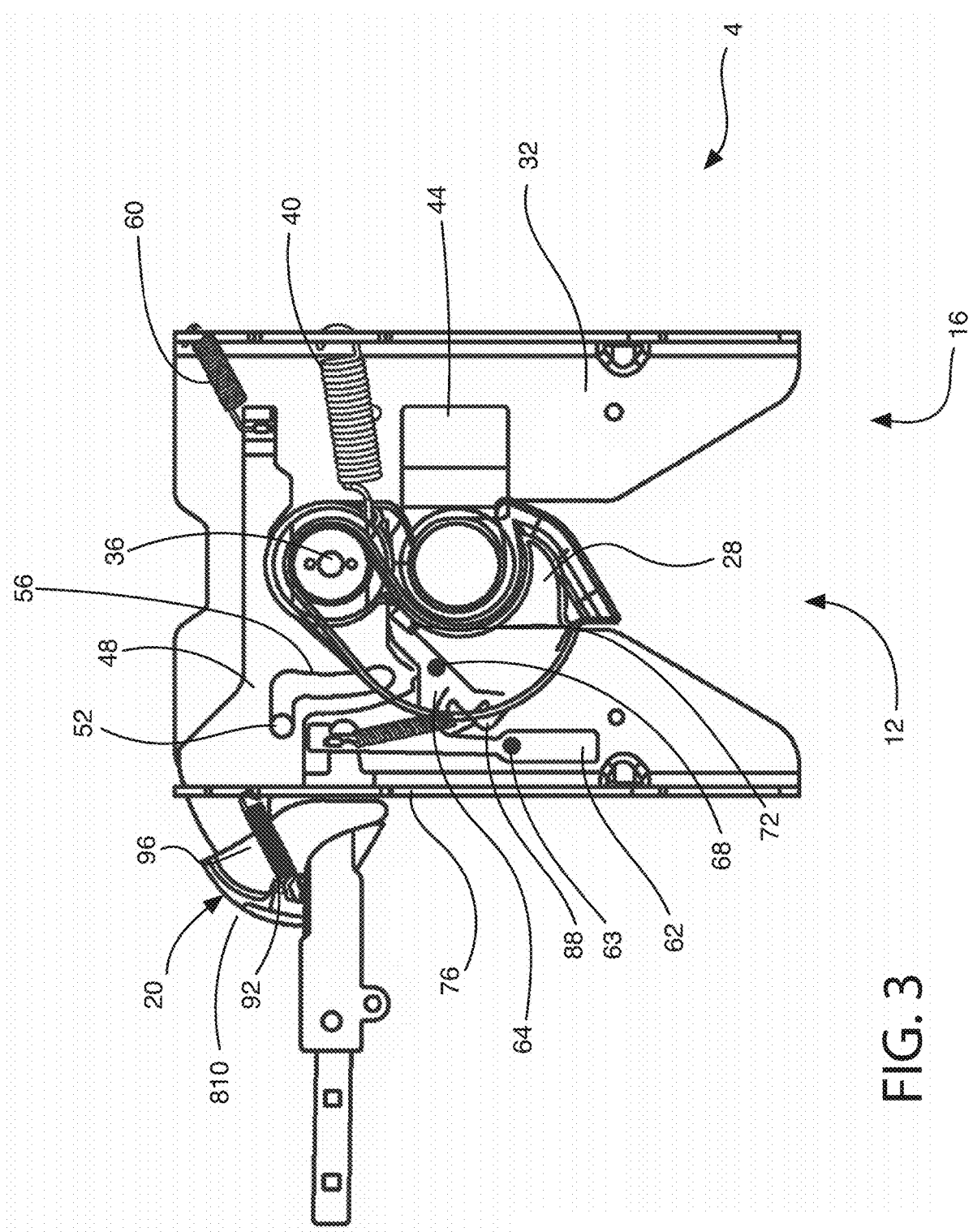
FIG. 3 is a sectional top view of a fifth wheel hitch system of the present teachings in a closed/fully engaged position.
Figure 4:
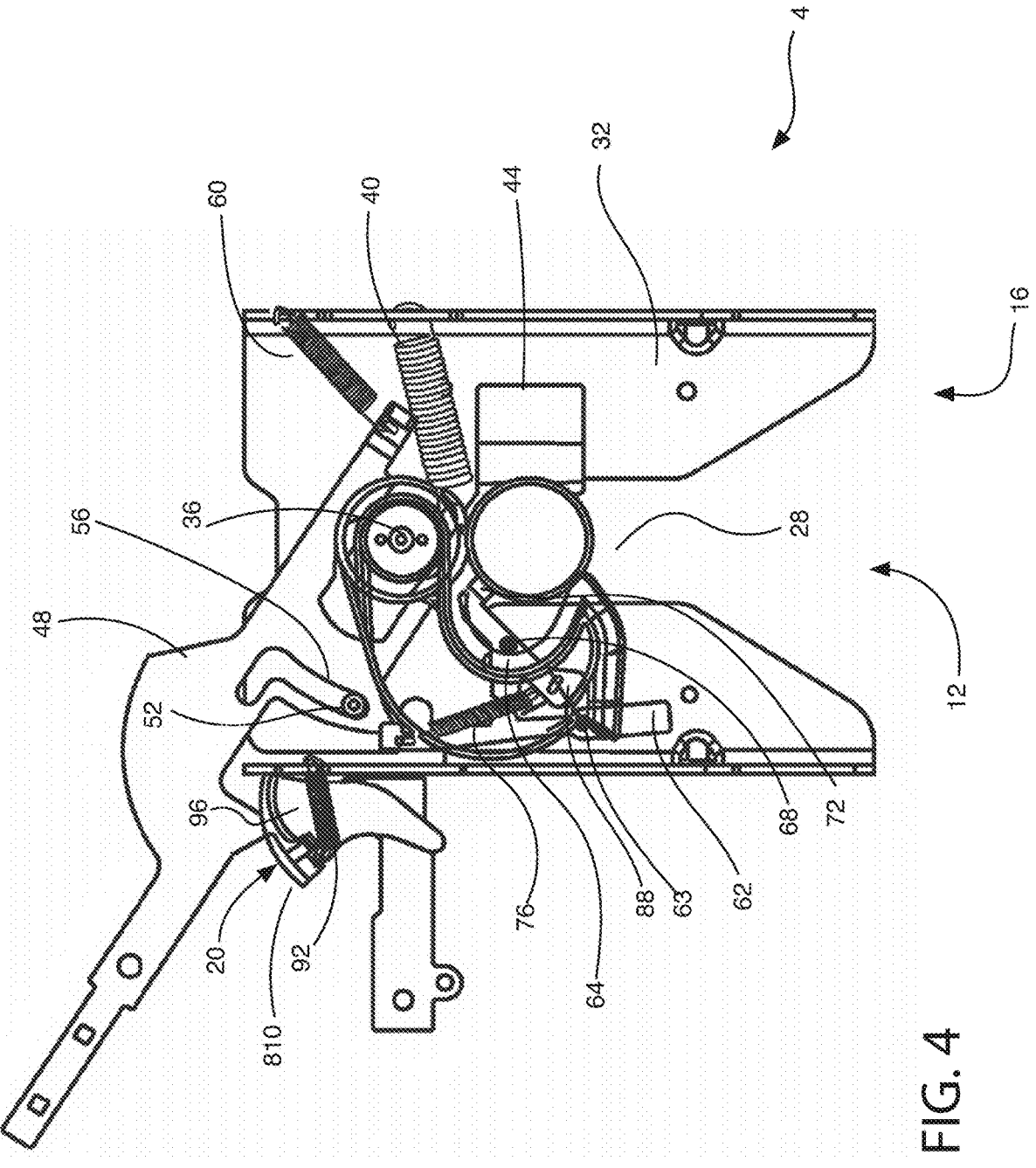
FIG. 4 is a sectional top view of a fifth wheel hitch system of the present teachings in an open/ready to uncouple position.

FIG. 2 depicts the engagement assembly 16 and indictor 20 in the free or ready to receive position. FIG. 3 depicts the engagement assembly 16 and indicator 20 in the closed or fully engaged position, i.e., fully engaged with the kingpin. FIG. 4 depicts the engagement assembly 16 and indicator 20 in the open or ready to uncouple position, i.e., the kingpin is removable from the fifth wheel hitch system 4.

Still referring to FIG. 2, a fifth wheel hitch system 4 may include a head 32 defining a throat portion 12, with a jaw 28 that may be mounted for rotation about a pivot pin 36 and may be biased toward the throat portion 12 by a jaw biasing member 40. Opposite the jaw 28, a rigid kingpin guiding member 44 may be fixed to the head 32 so that a minor diameter of an entering kingpin may initially bear against the guiding member 44 while the jaw 28 may be permitted to rotate. A handle 48 may be coupled to the head 32 via a guide bolt 52 received in a guide slot 56 formed in the handle 48, and a handle biasing member 60 may urge the handle 48 toward an engaged/coupled orientation. A handle lockout member 62 may be pivotally supported on a pin 63 and may be operatively connected to a kingpin detector member 64 by a biasing member 76. The kingpin detector member 64 may include an arm 68 terminating in an engagement portion 72 that may protrude into the throat portion 12 in the ready state to sense kingpin presence and to position the handle 48 for subsequent latching. An indicator system 20 may be mounted to the head 32 and may include a window 84 and an indicator biasing member 92 that may bias an indicator face toward a default state visible through the window 84 until full engagement may occur.

Additional embodiments of a fifth wheel hitch system according to the present teachings are described below. In the descriptions, all of the details and components may not be fully described or shown. Rather, the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired fifth wheel hitch system without departing from the spirit and scope of the present teachings.

Figure 5:
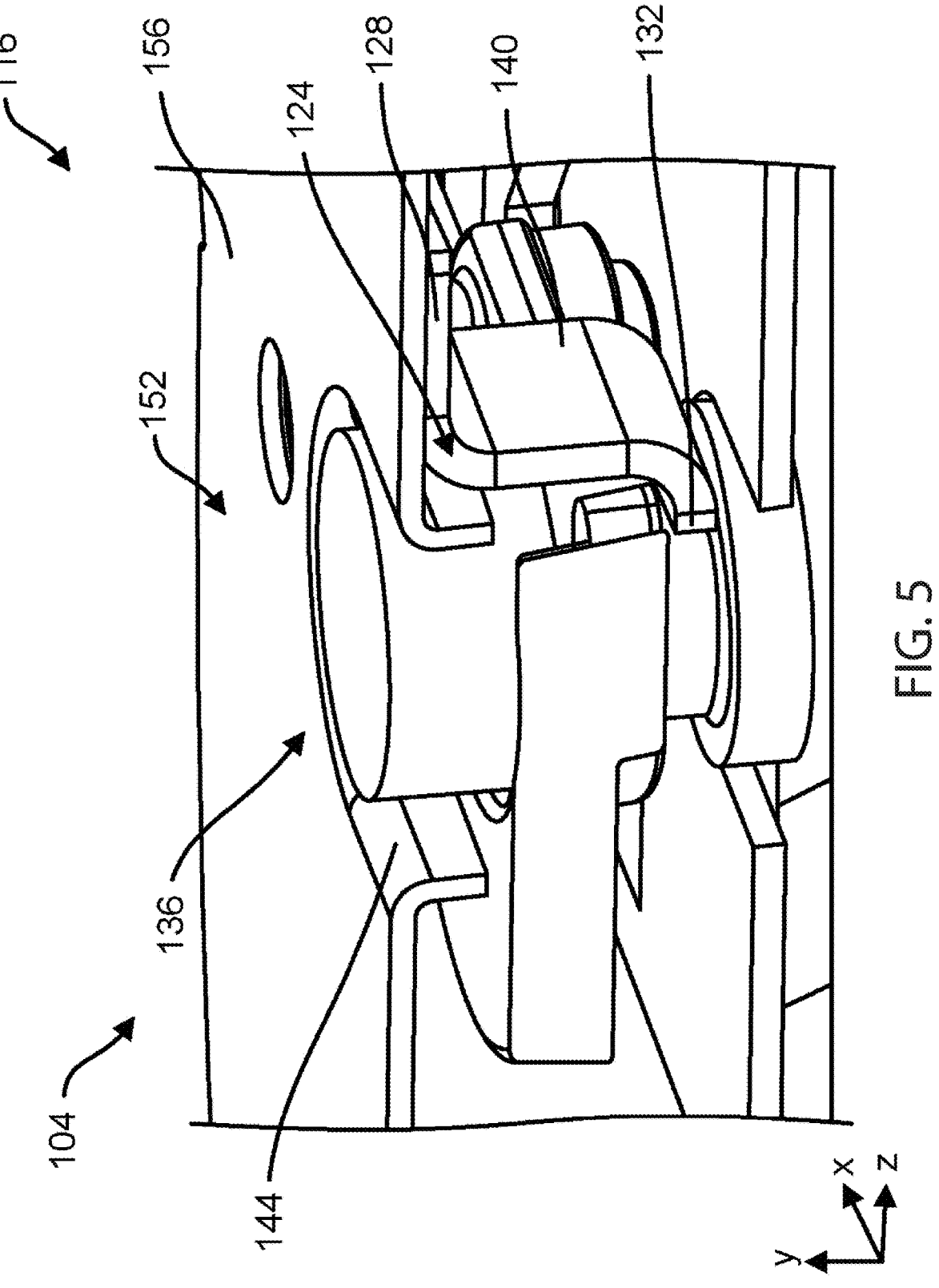
FIG. 5 is a perspective view of a kingpin guiding member in accordance with various embodiments described herein.
Figure 6:
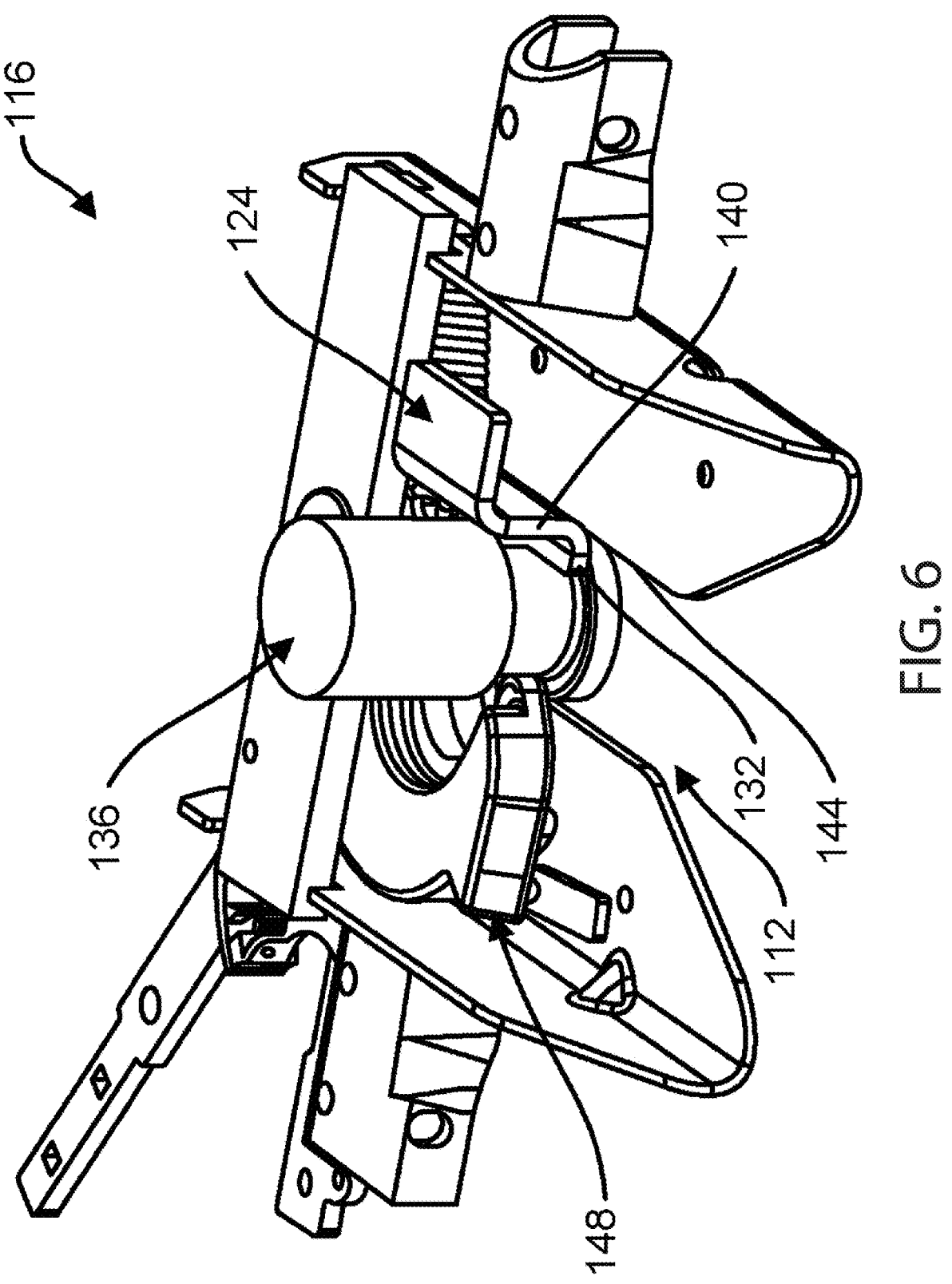
FIG. 6 is a perspective view of a kingpin guiding member in accordance with various embodiments described herein.

A portion of an exemplary embodiment of an engagement assembly 116 of a fifth wheel hitch system 104 is shown in FIG. 5. The engagement assembly 116 may include at least one kingpin guiding member 124. The at least one kingpin guiding member 124 may include a first flange portion 128 and a second flange portion 132. The second flange portion 132 may be configured to guide a kingpin 136 in a securely locked position, such as for example shown in FIGS. 5 and 6. FIGS. 5 and 6 depict a perspective view of a non-limiting example of at least one kingpin guiding member 124 in accordance with various embodiments described herein.

The at least one kingpin guiding member 124 may include a longitudinal portion 140 along the y-axis, the first flange portion 128 extending along the z-axis above the longitudinal portion 140, and the second flange portion 132 extending along the opposite z-axis below the longitudinal portion 140. The at least one kingpin guiding member 124 may be manufactured by forming a sheet-metal such as a monolithic member or may be formed through a subsequent forming operation such as welding the components together. The at least one kingpin guiding member 124 may be positioned in a hitch funnel 144, which may form part of the throat 112 of the fifth wheel hitch system 104. The hitch funnel 144 may provide a guide to the kingpin 136 from an opening side of the jaw 148 or jaw assembly. The kingpin guiding member 124 may be a fixed component within the system to receive the kingpin 136. The kingpin guiding member 124 helps to lead or guide the kingpin 136 into a locking position within the fifth wheel hitch system 4. The kingpin guiding member 124 may enclose and restrain the kingpin 136 as opposed to just the jaw or jaws themselves restraining the kingpin 136.

The first flange portion 128 of the at least one kingpin guiding member 124 may be secured to a mounting bracket 152 in any appropriate manner including, but not limited to, welding or utilizing mechanical fasteners. While a mounting bracket 152 is shown and disclosed, the first flange portion 128 may also be secured to an underside of a skid plate 156 of the fifth wheel hitch system 104. A skid plate cover similar to that described above may cover the skid plate 156 or they may be integrally formed together. The second flange portion 132 of the at least one kingpin guiding member may be bent staggered or offset with respect to the jaw 148. The second flange portion 132 may also be offset from the first flange portion 128, such as in a generally S-shape. It should be understood, however, that this is merely an exemplary embodiment and that the present system may apply to any manufacturing process, including, without limitation, one including a machining process, molding, casting, forging or any other type of processing as part of it. For the sake of brevity of the present disclosure, not every example is included, but the present application contemplates any such embodiments.

As shown in Figure. 3, insertion of the kingpin into the throat portion 12 may displace the engagement portion 72 of the kingpin detector member 64, causing the arm 68 to relieve constraint on the handle 48 so that the handle biasing member 60 may draw the handle 48 along the predefined path of the guide slot 56. The jaw 28, urged by the jaw biasing member 40, may rotate about the pivot pin 36 to wrap around the kingpin and occupy the throat portion 12 in a closed position, while the kingpin guiding member 44 may hold the kingpin against the jaw 28 to minimize lateral play. In this state, the handle lockout member 62 may be driven to a non-interfering orientation by interaction between the kingpin detector member 64 and the biasing member 76, and the indicator system 20 may rotate against the indicator biasing member 92 so that a "locked" sector may be presented through the window 84 to provide visual confirmation.

Referring to Figure. 4, when uncoupling may be initiated, the handle 48 may be withdrawn and rotated forward along the guide slot 56 until retained by the handle lockout member 62 at a defined detent position that may maintain the jaw 28 clear of the throat portion 12 against the force of the jaw biasing member 40. While the kingpin remains fully inserted, the kingpin detector member 64 may be rotated such that the engagement portion 72 may remain displaced from the throat portion 12, allowing the handle lockout member 62 to hold the handle 48 in its rotated position. Upon removal of the kingpin, the engagement portion 72 may return into the throat portion 12 under bias of the biasing member 76, where a second portion of the arm 68 may actuate the handle lockout member 62 to release the handle 48, enabling the handle 48 and jaw 28 to return along the guide slot 56 toward the biased, ready-to-receive state; the indicator system 20 may then revert under the indicator biasing member 92 to display an "unlocked" sector through the window 84.

As shown in Figure. 6, an engagement assembly 116 may incorporate at least one kingpin guiding member 124 having a first flange portion 128, a longitudinal portion 140, and a second flange portion 132 offset from the first flange portion 128. The guiding member 124 may be mounted within a hitch funnel 144 beneath a skid plate 156—for example by securing the first flange portion 128 to a mounting bracket 152—so that the second flange portion 132 may project toward a jaw 148. The second flange portion 132 may include a curved flange portion 168 that may conform to a minor diameter region of the kingpin and a leading edge 172 shaped to cam the kingpin into the hitch funnel 144. In operation, if the kingpin may approach in a high-pin condition, the second flange portion 132 may support the kingpin and may physically block rotation of the jaw 148 into a locked orientation, thereby providing a visual and functional indication of misalignment while also constraining the kingpin laterally for subsequent proper entry.

Figure 7:
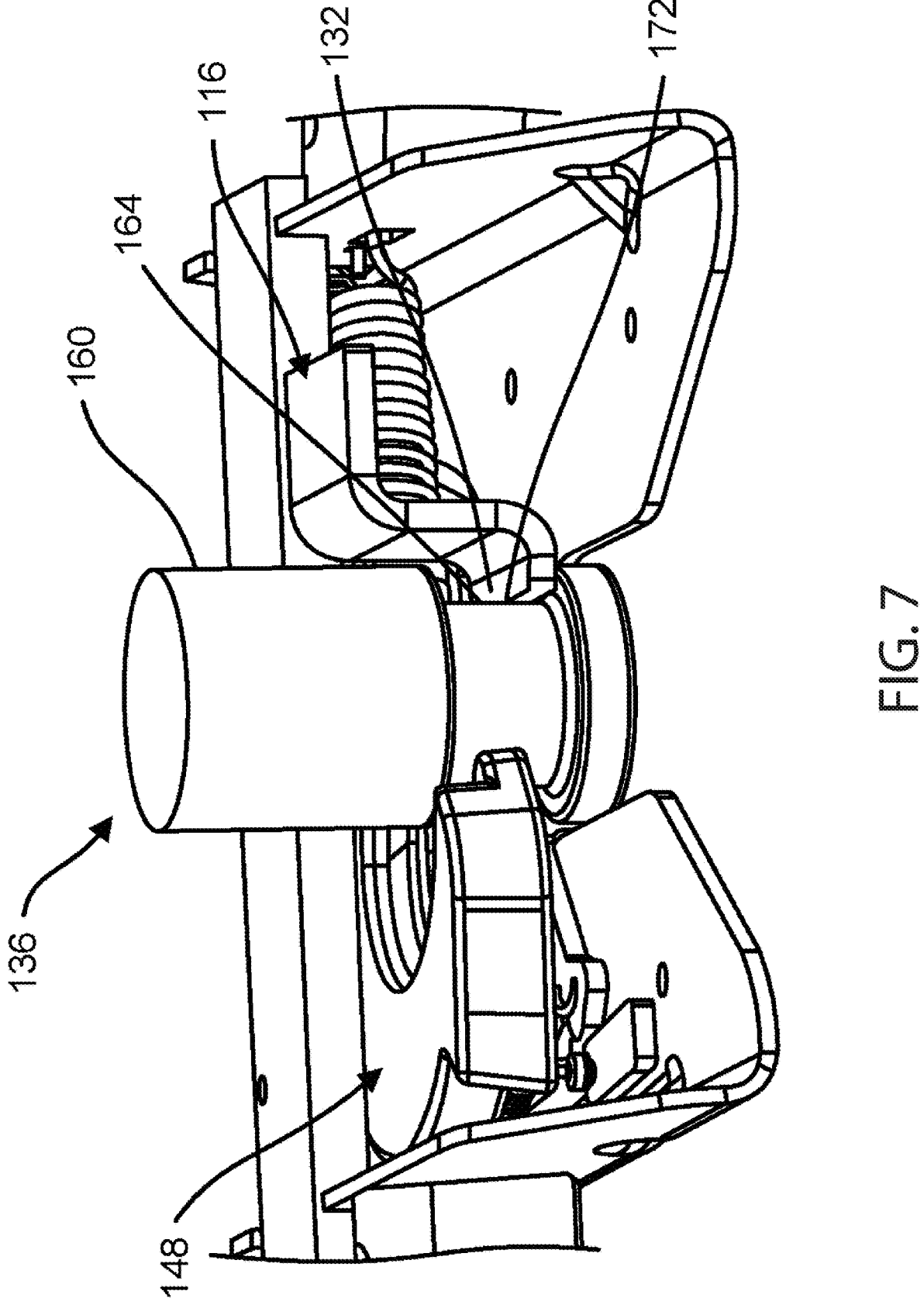
FIG. 7 is a perspective view of a kingpin guiding member in accordance with various described embodiments.

As illustrated in FIG. 7, the kingpin 136 may be generally cylindrically shaped with one or more outer surfaces. A first outer surface 160 of the kingpin 136 may have a larger diameter with respect to a second outer surface 164. The second flange portion 132 may be configured to be in contact with or engagement with the second outer surface 164 located generally in a middle portion of the kingpin 136. The at least one kingpin guiding member 124 may allow a reduction of overall space between the working components, which may be typically associated with a dual jaw system or a single jaw system. Additionally, it should be appreciated with reference to FIGS. 7 and 8 that the at least one kingpin guiding member 124 may prevent the kingpin 136 from passing from the secured position—it may engage and restrain the kingpin 136. Further, it may provide notice to the user that the engagement of the kingpin guiding member 124 and kingpin 136 is not in the appropriate operating position. The second flange portion 132 may fit or engage the minor diameter of the kingpin 136, i.e., the second outer surface 164. If the kingpin 136 is not in the operative locking position (such as in a high-pin position) the kingpin 136 will land on the second flange portion 132. This may prevent the jaw or jaws 148 from moving to the locked position. This failure of the jaw or jaws 148 to lock can provide visual evidence to the user that the kingpin 136 is not in an operative position. For example, it can provide visual evidence to the user that the kingpin 136 is in the high-pin position. This structural arrangement may advantageously allow for less chucking requirement between the kingpin 136 and a hitch head thereby simplifying a towed vehicle installation.

Figure 8:
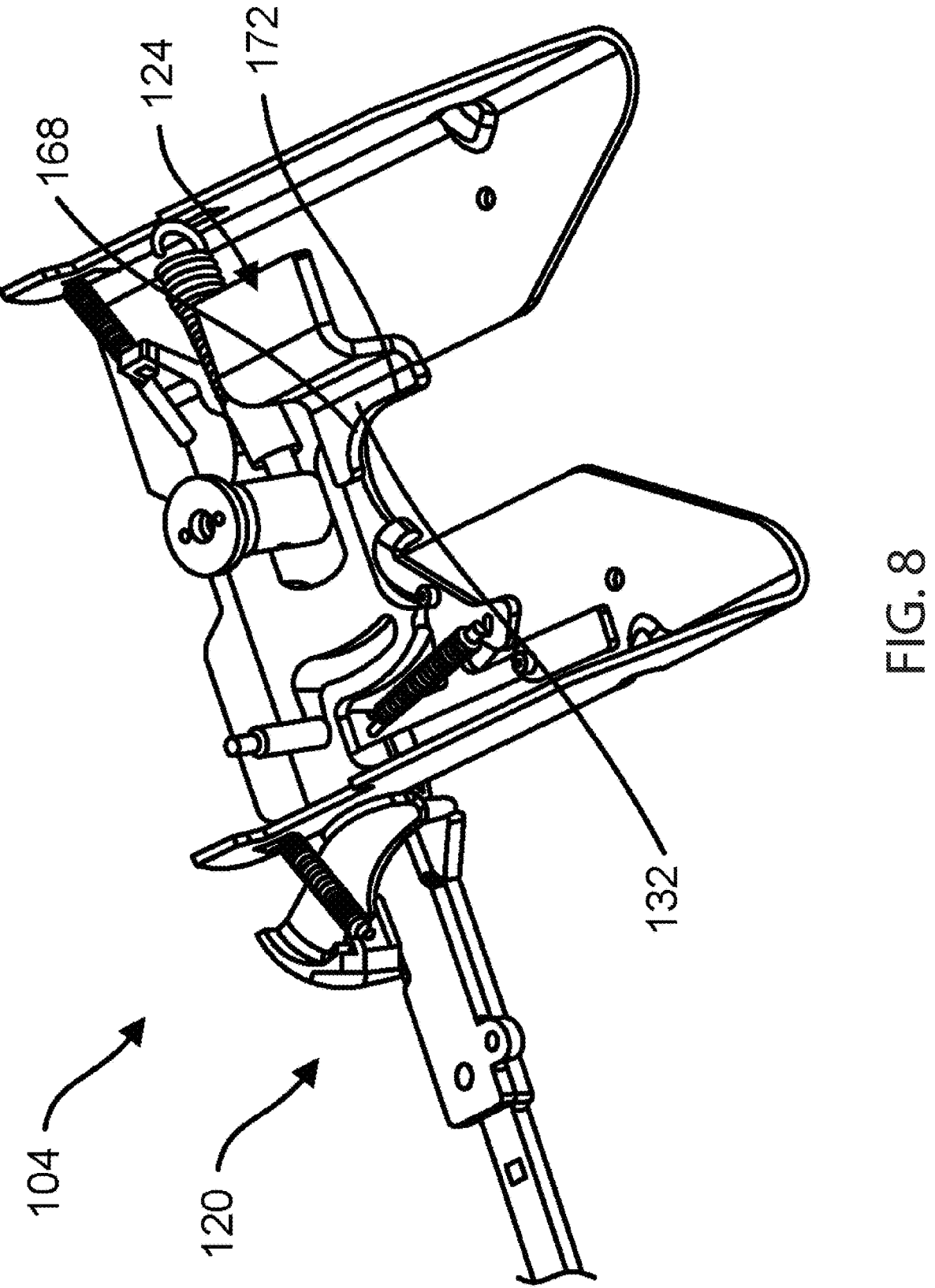
FIG. 8 is a top perspective view of a kingpin guiding member in accordance with various described embodiments.

As show in FIG. 8, the second flange portion 132 of the at least one kingpin guiding member 124 may include a curved flange portion 168. The curved flange portion 168 may be of a similar shape to that of the kingpin 136. In particular, the curved flanged portion 168 may engage the minor diameter of the kingpin 136 or more specifically, the second outer surface 164 of the kingpin 136. The at least one kingpin guiding member 124 may allow the operator to operatively align and connect the towing vehicle to the kingpin 136 of a towed vehicle. This may prevent the operator from connecting the hitch in a high pin position, which is not desirable. Further still, the kingpin guiding member 124 may include a leading edge 172, such as that shown in FIGS. 7 and 8. The leading edge 172 may be of such a configuration to allow the kingpin 136 to be guided into the hitch funnel 144 of the skid plate 156, as shown in FIG. 5, to allow the kingpin 136 to be operatively engaged and locked. The leading edge 172 may be of any appropriate shape to allow the kingpin 136 to enter into the hitch funnel 144. By way of a non-limiting example, the leading edge 172 may comprise a curved portion that engages the kingpin 136 as it enters the hitch funnel 144. This curved shape may engage the second outer surface 164 of the kingpin 136 and guide it as it enters into and through the hitch funnel 144 to its operatively locked position within the fifth wheel hitch system 104.

The at least one kingpin guiding member 124 may be further connected to an interface module (not shown here) to generate a misuse Sensor State or Flag, if the kingpin 136 is locked in a high pinned position. The interface module may include a transceiver configured to transmit and receive information through a vehicle On-Board Diagnostics (OBD) in a wired or wireless configuration. The interface module may further be in operative communication by generating and wirelessly transmitting a signal to the receiving device such as a smart phone. Examples of such wireless configuration may include, but is not limited to, various radio access network (RAN), e.g., Wi-Fi, global system for mobile communications, universal mobile telecommunications systems, worldwide interoperability for microwave access, enhanced general packet radio service, third generation partnership project long term evolution (3G LTE), fourth generation long term evolution (4G LTE), third generation partnership project 2, BLUETOOTH®, ultra mobile broadband, high speed packet access, xth generation long term evolution, or another IEEE 802.XX technology. Furthermore, embodiments may utilize wired communications. The smart phone may display the sensor state to enable the operator to adjust the position at which the kingpin comes into securely locked position.

Further, the sensor state of the present disclosure is not limited to the electronic system as described above. In addition to or alternatively, the sensor state may be how the system above prevents the jaws or jaw 148 from locking if the kingpin 136 is not in its operative locking position within the fifth wheel hitch system 104. The sensor state generally prevents the user from believing the kingpin 136 is in an operative and locked position when it is not, i.e., it generally prevents a false-positive detection of the kingpin 136 being in a locked or lockable position. In addition to the jaws or jaw 148 not operatively closing and/or locking if the kingpin 136 is not operatively positioned, if the user continues to attempt to force the kingpin 136 into and through the hitch funnel 144 towards the closed and locked position when not actually in such position (e.g., a high-pin position), the kingpin guiding member 124 may deform. This deformation may visually alert the user that the kingpin 136 is not in the operative locked position and is not operatively engaged with the kingpin guiding member 124. The kingpin guiding member 124 may be formed such that a predetermined amount for force applied to a predetermined location, e.g., when on the second flange portion 132, the kingpin guiding member 124 may deform.

Figure 9:
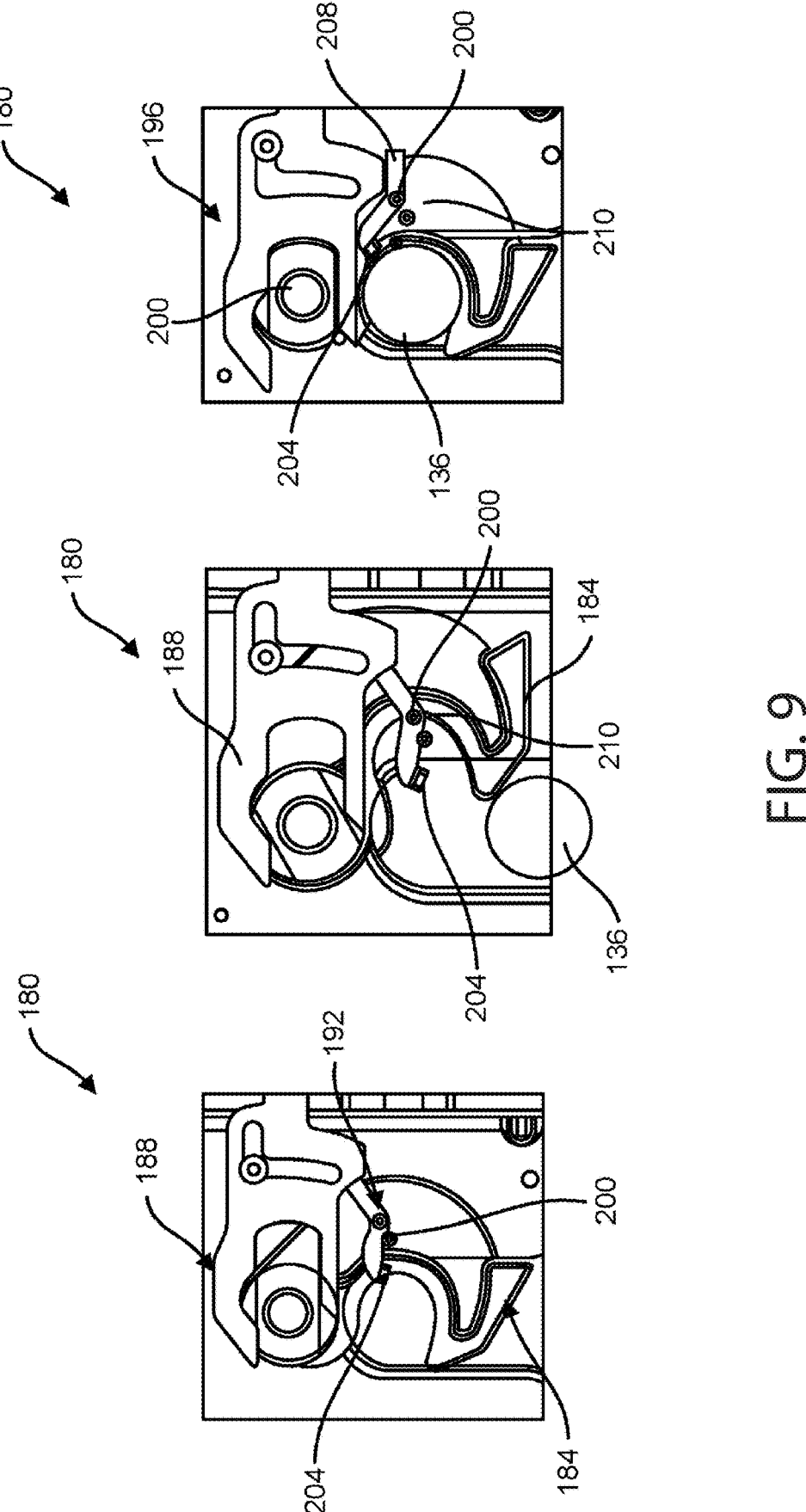
FIG. 9 is a perspective view of a kingpin latching assembly for operatively engaging a kingpin in accordance with various described embodiments.
Figure 10:
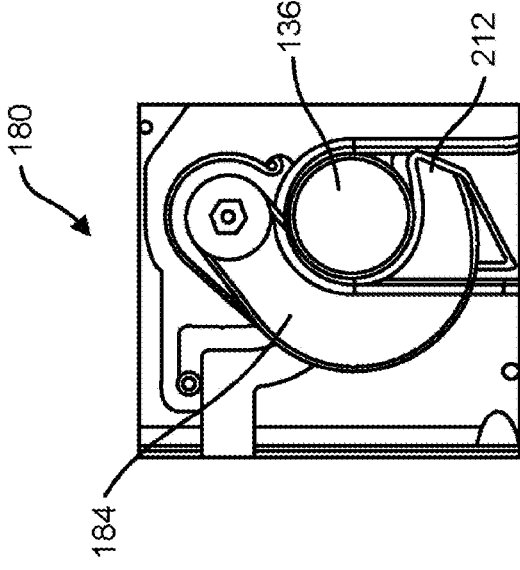
FIG. 10 is a perspective view of a kingpin latching assembly for operatively engaging a kingpin in accordance with various described embodiments.
Figure 10:
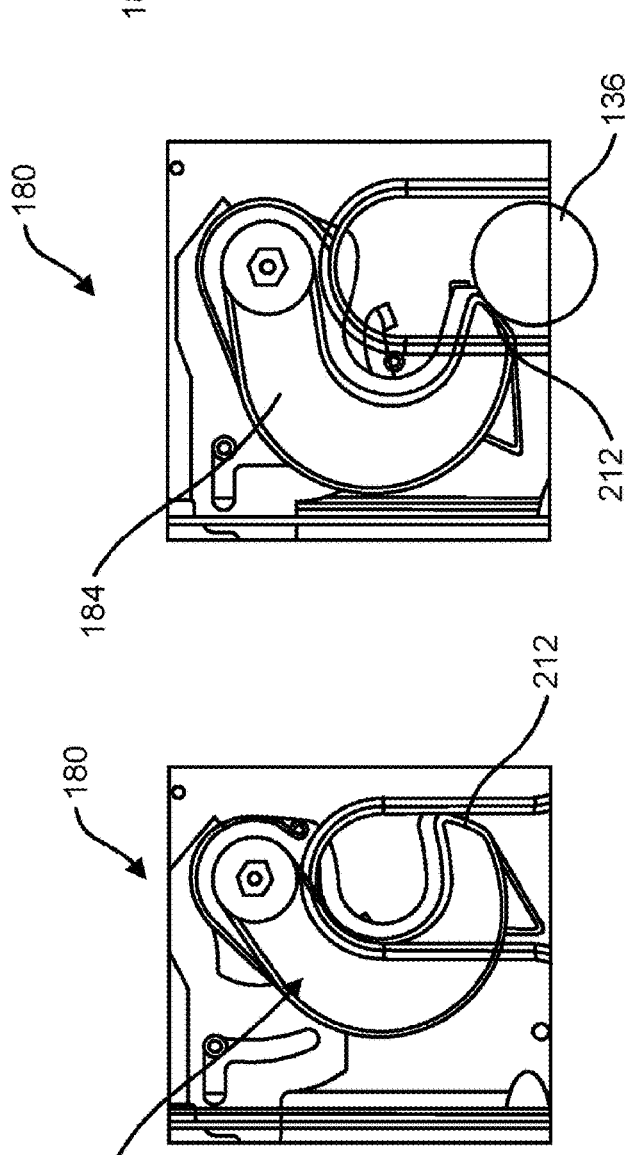

The engagement assembly 116 may comprise a latching assembly 180. As illustrated in FIGS. 9 and 10, a kingpin latching assembly 180 may include a jaw 184 or jaw assembly, an engagement handle 188, and a kingpin detector member 192. The jaw 184 may be of a similar configuration to the jaw 148 described above or it may be of a different configuration. The teachings herein contemplate both configurations. The kingpin latching assembly 180 may be configured to operatively receive the kingpin 136 and adjustably engage the kingpin detector member 192 with the engagement handle 188, when the kingpin 136 is not inserted.

In some embodiments, the jaw 184 may include an angled face 212 on a receiving surface, allowing the kingpin 136 to push it open when the kingpin 136 is not inserted and/or locked. A biasing member, e.g. spring, may be used to force or bias the jaw 184 to a closed position.

The engagement handle 188 may be configured to interact directly with the jaw 184. The engagement handle 188 may further engage the jaw 184 in the closed position when fully engaged. If the kingpin 136 is partially engaged, the engagement handle 88 serves to prevent the jaw 184 from closing, i.e., the handle 188 may not be able to latch or lock.

The kingpin detector member 192 is configured to detect and identify the presence of the kingpin 136 and operatively and adjustably engage the engagement handle 188 allowing the jaw 184 to place the kingpin 136 into a securely locked position. The kingpin detector member 192 may be positioned to protrude into the funnel when the kingpin 136 is not inserted. When the kingpin detector member 192 is fully protruded, the kingpin latching assembly blocks the engagement handle 188 from fully engaging, thereby allowing the jaw 184 to open. When kingpin 136 is inserted, the kingpin latching assembly is depressed, allowing the engagement handle 188 to fully engage the jaw.

As best illustrated in FIGS. 9 and 10, a kingpin detector member 192 may be pivotally connected to a mounting platform 196 by means of a pivot pin 200. The kingpin detector member 192 may include a kingpin detecting end 204, a handle engaging end 208, and an intermediate pivot point 210 in the form of an aperture that receives the pivot pin 200. A biasing device, such as a spring, may bias the kingpin detector member 192 to the home or closed position. In such embodiments, the kingpin detector member 192 may catch the minor diameter of the kingpin 136 upon insertion of the kingpin 136 into the throat of the fifth wheel hitch. As the kingpin 136 moves toward the throat of the fifth wheel hitch, the kingpin detector member 192 rotates. This allows the engagement handle 188 to engage the jaw or jaws in the closed and locked position. The system further may prevent the kingpin 136 from being removed from the fifth wheel hitch. The system can be summarized as a hitching, latching and locking. The kingpin 136 is hitched toward the fifth wheel hitch. The kingpin 136 moves within the throat of the fifth wheel hitch to a latching position. The kingpin 136 engages the handle 188 and the kingpin detector member 192 to lock the kingpin 136 to the fifth wheel hitch.

FIG. 9 exemplifies, specifically, a kingpin latching assembly 180 in which a jaw 184 with an angled face 212 may be positioned to be cammed open by an entering kingpin, an engagement handle 188 may be arranged to selectively secure the jaw 184 in a closed state, and a kingpin detector member 192 may coordinate handle timing. The kingpin detector member 192 may be pivotally coupled to a mounting platform 196 via a pivot pin 200 through an intermediate pivot point 210 and may present a kingpin detecting end 204 into the funnel region. When the kingpin detecting end 204 may be fully protruded (kingpin absent), a handle engaging end 208 of the kingpin detector member 192 may interfere with or block travel of the engagement handle 188, thereby allowing the jaw 184 to remain open as needed. A biasing device acting on the kingpin detector member 192 may return the member to this home position when no kingpin load may be present, ensuring repeatable sequencing prior to latching.

Further, FIG. 10, specifically, exemplifies insertion of the kingpin, the kingpin may rotate the kingpin detector member 192 about the pivot pin 200, retracting the kingpin detecting end 204 and shifting the handle engaging end 208 out of interference with the engagement handle 188. With the interference removed, the engagement handle 188 may advance to drive or hold the jaw 184 into the closed position, where the jaw 184 may surround the kingpin and the angled face 212 may rotate past the camming interaction. In the locked state, the coordinated geometry of the engagement handle 188, the jaw 184, and the kingpin detector member 192 may prevent inadvertent withdrawal of the kingpin until the engagement handle 188 may be deliberately moved to reopen the jaw 184, thereby completing a hitching-latching-locking sequence on insertion and an unlocking-release sequence on removal.

Figure 11:
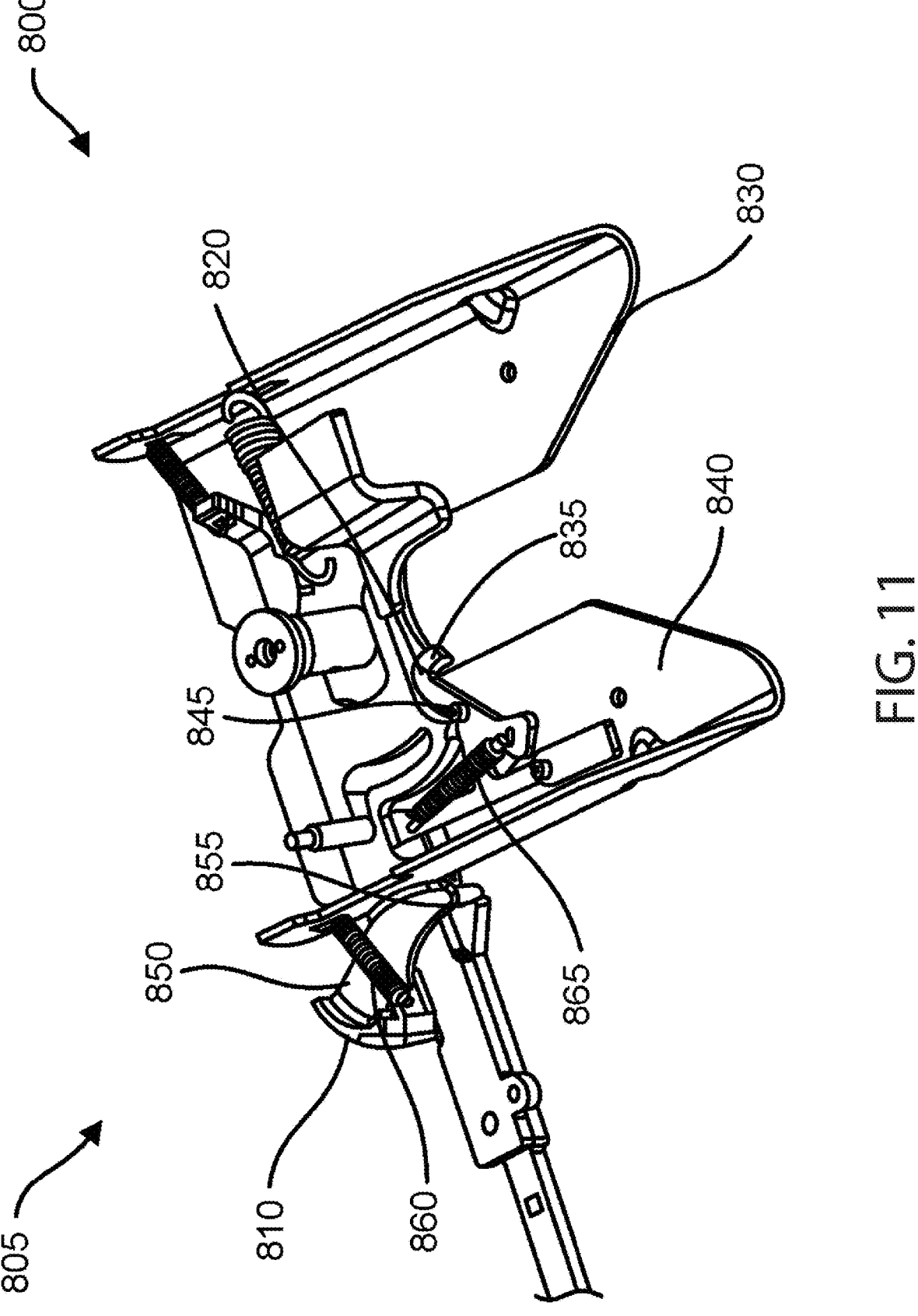
FIG. 11 is a perspective view of a portion of embodiments of a fifth wheel hitch system in a locked position.
Figure 12:
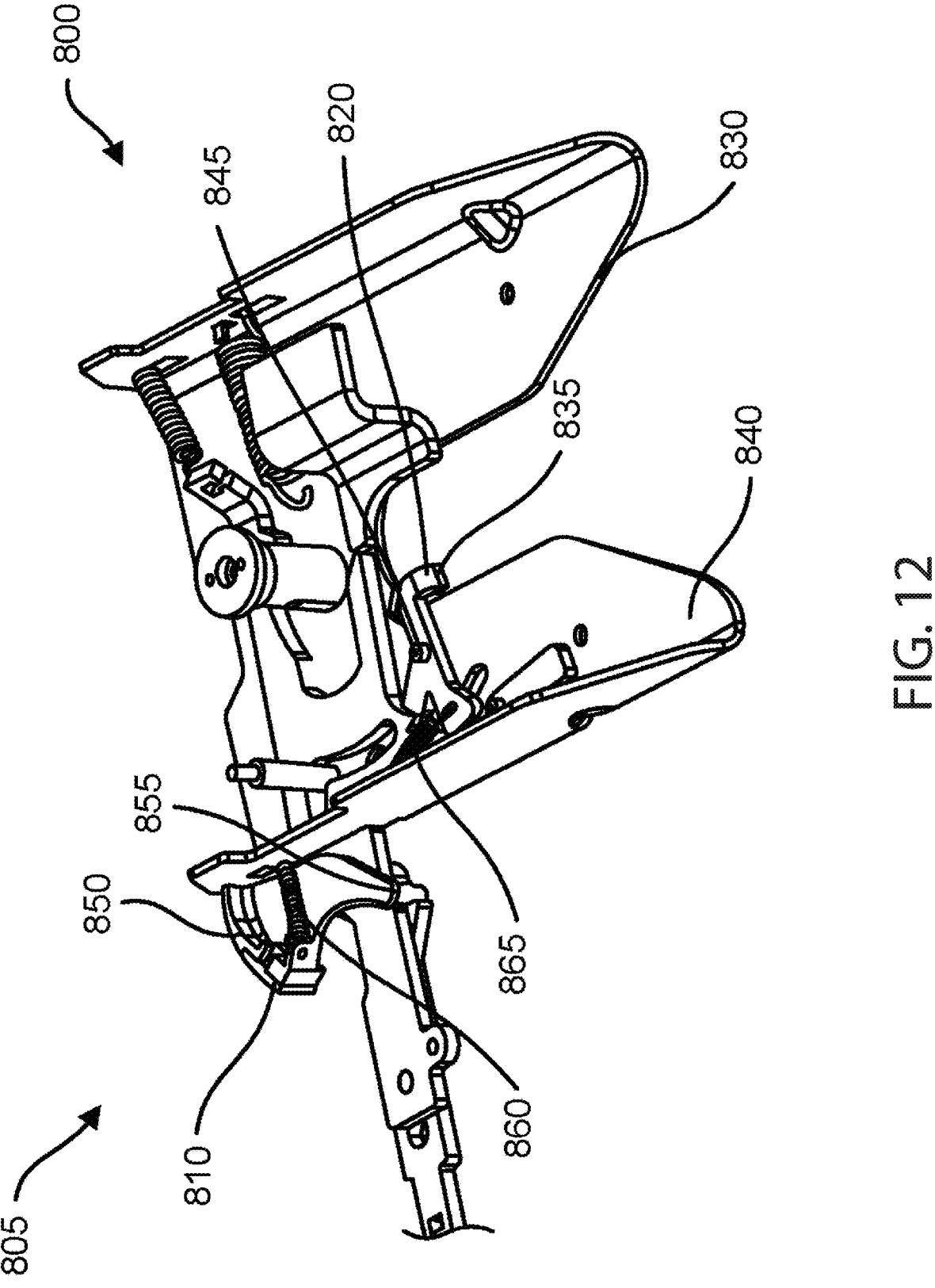
FIG. 12 is a perspective view of a portion of embodiments of a fifth wheel hitch system in an unlocked/hitching position.

An embodiment of a fifth wheel hitch system 800 is shown in FIGS. 11 and 12. The fifth wheel hitch system 800 may include an indicator system 805 that will identify the position of the fifth wheel hitch system 800. For example, the indicator system 805 may identify to a user when the fifth wheel hitch system 800 is in an unlocked or hitching position whereby the jaws and the remaining portions of the fifth wheel hitch system 800 are able to accept the kingpin to engage the kingpin. Further, the indicator system 805 may identify to a user when the fifth wheel hitch system 800 is in a locked position whereby the jaws and the remaining portions of the fifth wheel hitch system 800 are operatively engaged with the kingpin.

The indicator system may 805 may include an arm 820 configured to engage a kingpin as it enters into a throat 830 of the fifth wheel hitch system 800. As the kingpin moves toward the fifth wheel hitch system 800 (or the fifth wheel hitch system 800 moves toward the kingpin), the kingpin engages an engagement portion 835 of the arm 820. As the kingpin engages the engagement portion 835, it will pivot the arm 820. As shown in FIGS. 11 and 12, the arm 820 may be pivotally attached with a bottom portion 840 of the fifth wheel hitch assembly 800 at a pivot point 845. As the kingpin engages the engagement portion 835, this will cause the arm 820 to pivot about the pivot point 845.

The arm 820 may be operatively secured with an indicator arm 850. In such embodiments, as the arm 820 pivots about pivot point 845, the indicator arm 850 may pivot about indicator pivot point 855. The arm 820 and indicator arm 850 may be operatively secured in any appropriate manner, such as through a rod, plate, cable, or any other appropriate manner. Therefore, as the arm 820 pivots when the kingpin enters the throat 830, the indicator arm 850 pivots. The pivoting may be one-to-one, i.e., the arm 820 pivots the same amount as the indicator arm 850. Alternatively, the indicator arm 850 may pivot relative to the arm 820 by a fixed percentage, e.g., 25% to 200%. However, these are merely exemplary and the indicator arm 850 may move relative to the arm 820 in any manner.

The indicator system 805 may include an indicator face 810. The indicator face 810 may include a face that provides a visual indicator of whether the fifth wheel hitch system 800 is in the locked or hitching position. The indicator face 810 may be of any appropriate configuration. By way of a non-limiting example, a portion of the indicator face 810 may be red and a second portion green. The indicator face 810 may be configured such that the red portion is visible to the user when the fifth wheel hitch system 800 is in a hitching position and green when the fifth wheel hitch system 800 is in a locked position. The present disclosure contemplates the opposite as well. The indicator face 810 may identify the sensor state. In those embodiments in which there are two sensor states (i.e., whether the fifth wheel hitch system 800 is in the locking, latching or hitching position), the indicator face 810 may include two identifiers (e.g., red and green). In other embodiments, if there are more than two sensor states, e.g., three, the indicator face 810 may include three separate identifiers (e.g., red, green and yellow)

As the kingpin moves away from the engagement portion 835 the indicator arm 850 and arm 820 are biased toward the front portion of the throat 830. In the exemplary embodiment shown, springs 860 and 865 may bias the indicator arm 850 and arm 820, respectively toward the throat 830. The pivoting/rotation of the indicator arm 850 may move the indicator face 810 from the indication of the locked position to indication of the hitching position. In some embodiments, the fifth wheel hitch skid plate may include an opening from which the indicator face 810 is visible to the user.

In some embodiments, the indicator face 810 may be positioned such that the user can see the indicator face 810 from the cab of the vehicle. Specifically, as the user steps from the cab of the vehicle, he or she can see the indicator face 810 to determine the position of the fifth wheel hitch system 800. The indicator face 810 may be positioned about 45 degrees relative to the cab of the vehicle (e.g., 45 degrees from the center of the cab).

Figure 13:
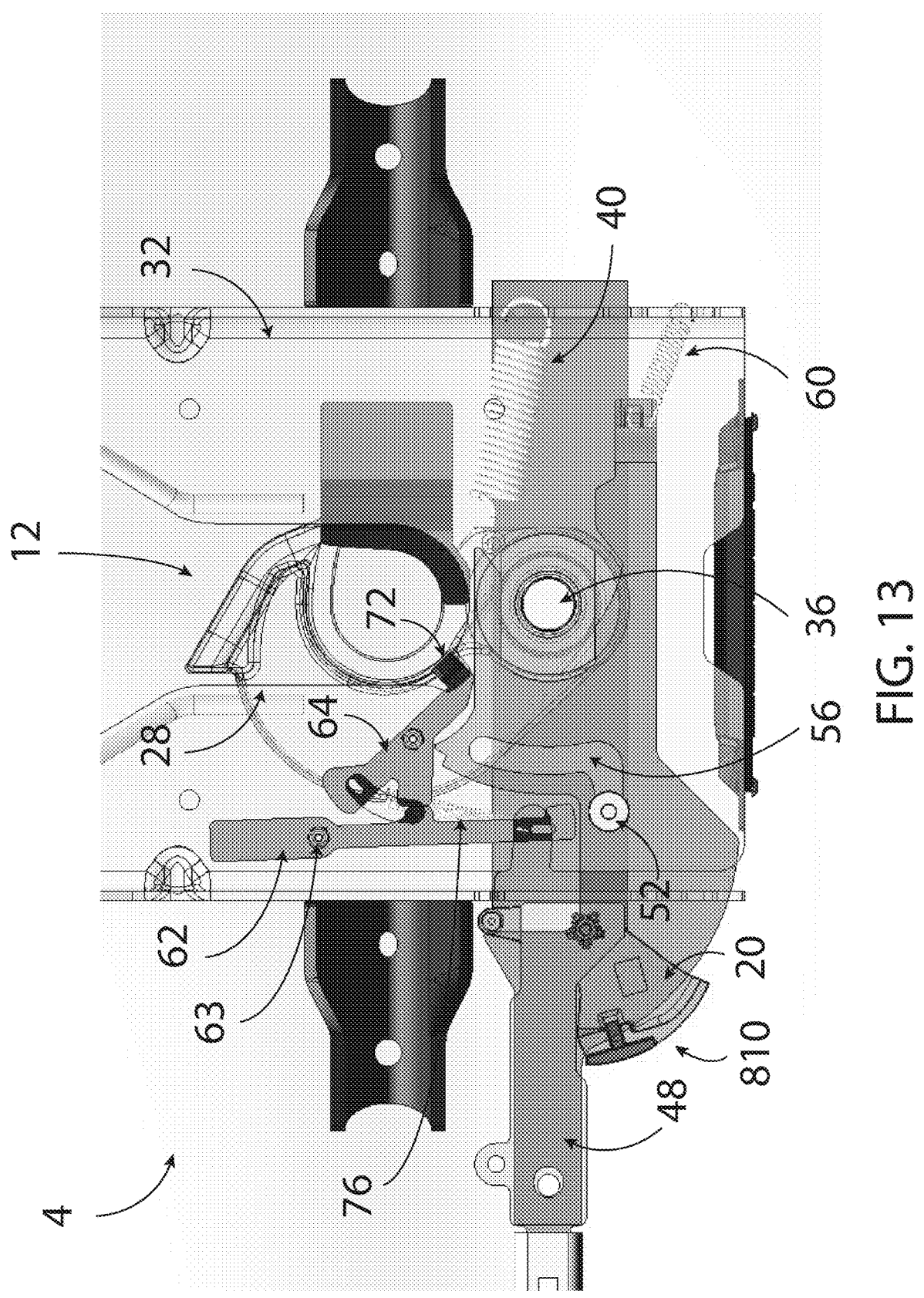
FIG. 13 is a top view a fifth wheel hitch system of the present disclosure in a ready to tow/locked position, according to some embodiments of the present disclosure

As shown in FIG. 13, an exemplary fifth wheel hitch system in a ready-to-tow (or locked position) is shown. The system 10 may include a head 32 defining a throat portion 12 configured to receive and secure a kingpin. A jaw 28 may be pivotally mounted about a pivot pin 36 and may be biased toward a closed position by a jaw biasing member 40 operatively coupled between the jaw 28 and the head 32. The jaw 28 may rotate about the pivot pin 36 between an open position and a closed position and may be biased by the jaw biasing member 40 toward a closed position once the kingpin is received in the throat portion 12. In this ready-to-tow (or locked position) configuration, the kingpin may be fully encircled by the jaw 28, and the biasing member 40 may maintain the jaw 28 securely against the kingpin to prevent disengagement during towing.

Engagement handle 48 may be coupled to the head 32 by a guide bolt 52 received within a guide slot 56 formed through the engagement handle 48. The guide slot 56 may define a curved or contoured path that constrains both the translational and rotational movement of the handle 48 as the system transitions between coupling and uncoupling states, e.g., when the jaw is in a closed v. open state. A handle biasing spring 60 may apply a restoring force urging the handle 48 inward toward the locked position. A handle lockout member 62 may be positioned adjacent handle 48 and may be configured to engage a complementary surface of the handle 48 to prevent unintended motion. The handle lockout member 62 may be operatively connected to a kingpin detector member 64 via a biasing member 76, such as, e.g., a spring. The kingpin detector member 64 may include an engagement portion 72 extending into the throat portion 12. When the kingpin is inserted and seated, the engagement portion 72 may be displaced, rotating the kingpin detector member 64, which may urge the handle lockout member 62 out of interference with the handle 48. This sequence may allow the handle 48 to move inward under spring bias, completing the locking operation. An indicator system 20 may include an indicator face 810 visible through an aperture in the head 32, which may display a "locked" state corresponding to a coupled configuration.

Figure 14:
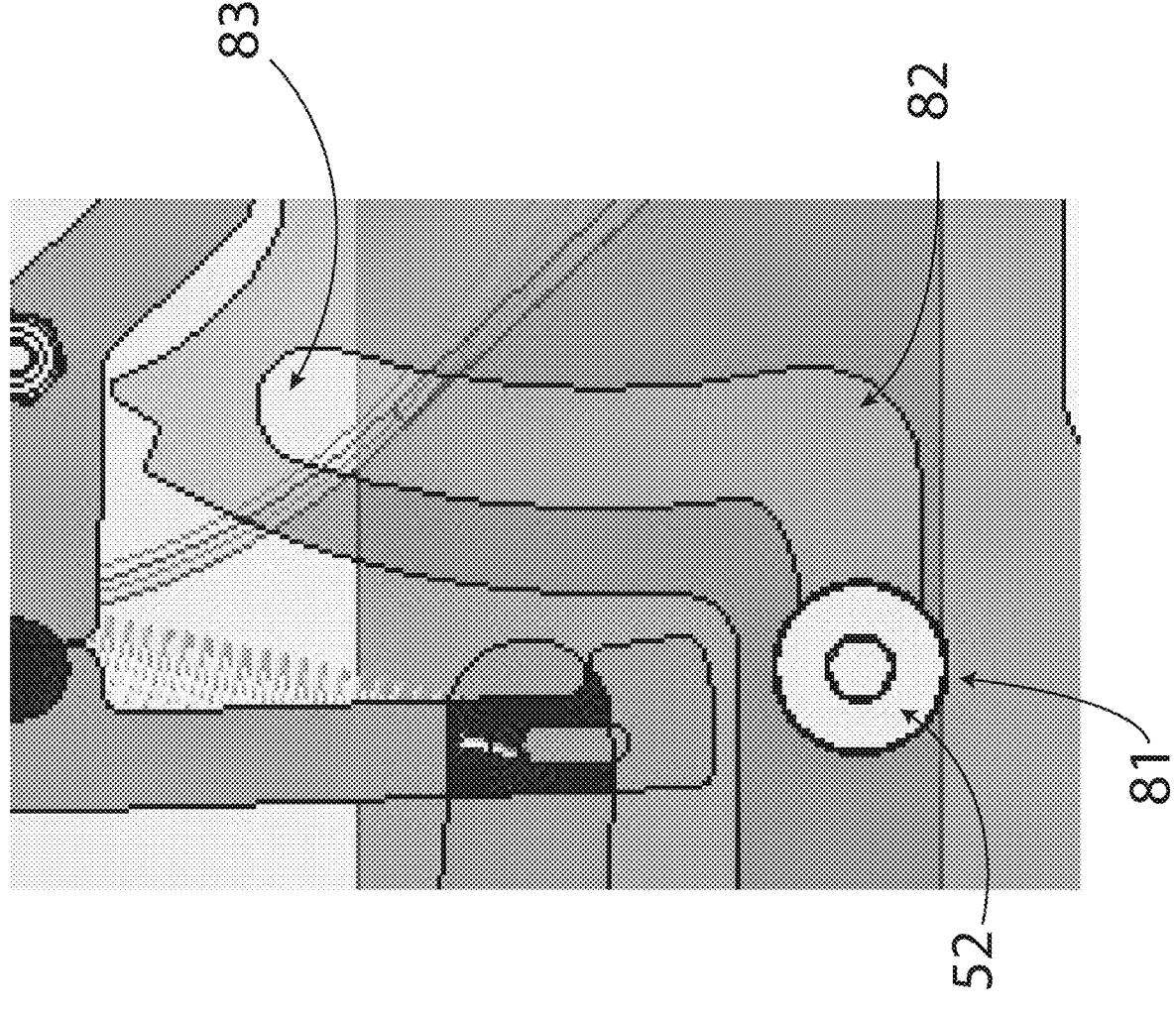
FIG. 14 is an enlarged view of the guide slot of the present disclosure, illustrating the guide bolt therein when the fifth wheel hitch system is in a ready to tow/locked position, according to some embodiments of the present disclosure.

As shown in FIG. 14, which provides an enlarged view of the guide slot in the locked position, the guide bolt 52 may be positioned within the guide slot 56 such that the system is securely coupled. The guide slot 56 may include two intersecting segments: one corresponding to an uncoupling range (e.g., from point 82 to point 83) and another corresponding to a coupling range (e.g., from point 81 to 82). Together, the guide bolt 52 and guide slot 56 may coordinate the motion of the handle 48 relative to the rotation of the jaw 28, ensuring that the handle 48 first translates outward for release and then rotates such as to allow remaining parts of the system to be positioned such that the jaw is rotatable to an open position, while the reverse sequence may occur for re-latching. When the system is in locked state, the jaw biasing member 40 may continuously bias the jaw 28 against the kingpin, and the guide bolt 52 may rest at position 81 of the guide slot 56, stabilizing the assembly against inadvertent opening.

Figure 15:
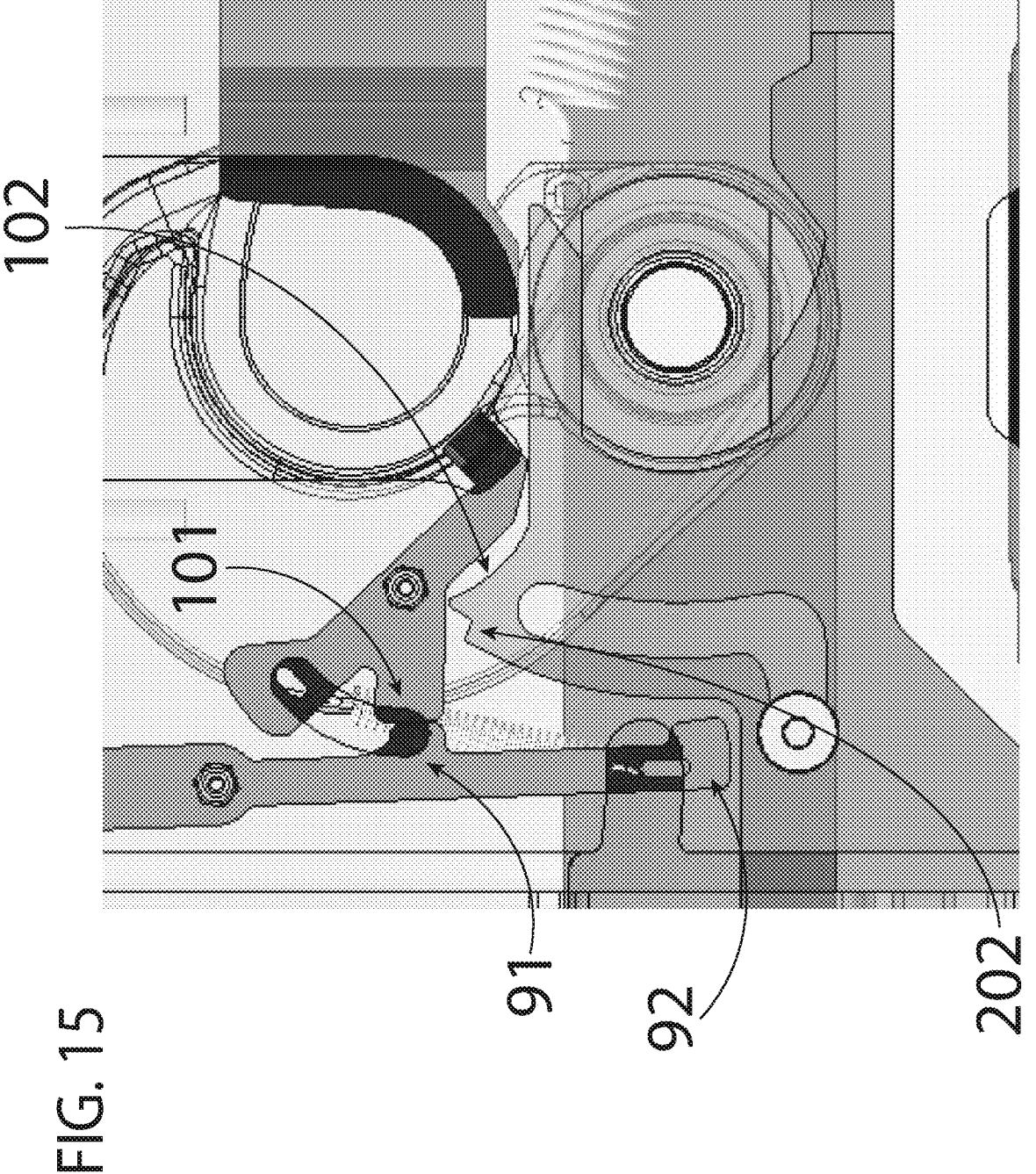
FIG. 15 is an enlarged view of the kingpin detector member, the handle lockout member, and the engagement handle when the fifth wheel hitch system is in a ready to tow/locked position, according to some embodiments of the present disclosure

FIG. 15 shows an enlarged view of the kingpin detector member 64, handle lockout member 62, and engagement handle 48 in a locked position. In this configuration, a detector member protrusion 101 of the kingpin detector member 64 may contact a guiding surface 102 of the engagement handle 48. This contact between a detector member protrusion 101 and guiding surface 102 is configured to prevent rotation or movement of the engagement handle 48, thereby maintaining the system in the locked condition. Engagement portion 72 of the kingpin detector member 64 may be displaced by the inserted kingpin, rotating the detector member 64 against the biasing member 76. As the detector member 64 rotates, the handle lockout member 62 may also rotate such that a handle lockout protrusion 91 of the handle lockout member 62 may abut against the detector member protrusion 101 of the kingpin detector member 64. This abutting engagement between a handle lockout protrusion 91 and the detector member protrusion 101 may prevent further motion of either the lockout member 62 or the detector member 64, thereby stabilizing the components in a static position. In this state, the jaw 28 may remain in the closed position, securing the kingpin within the throat portion 12, and the indicator face 810 may display a locked position to visually confirm to the operator that the system is ready for towing.

Figure 16:
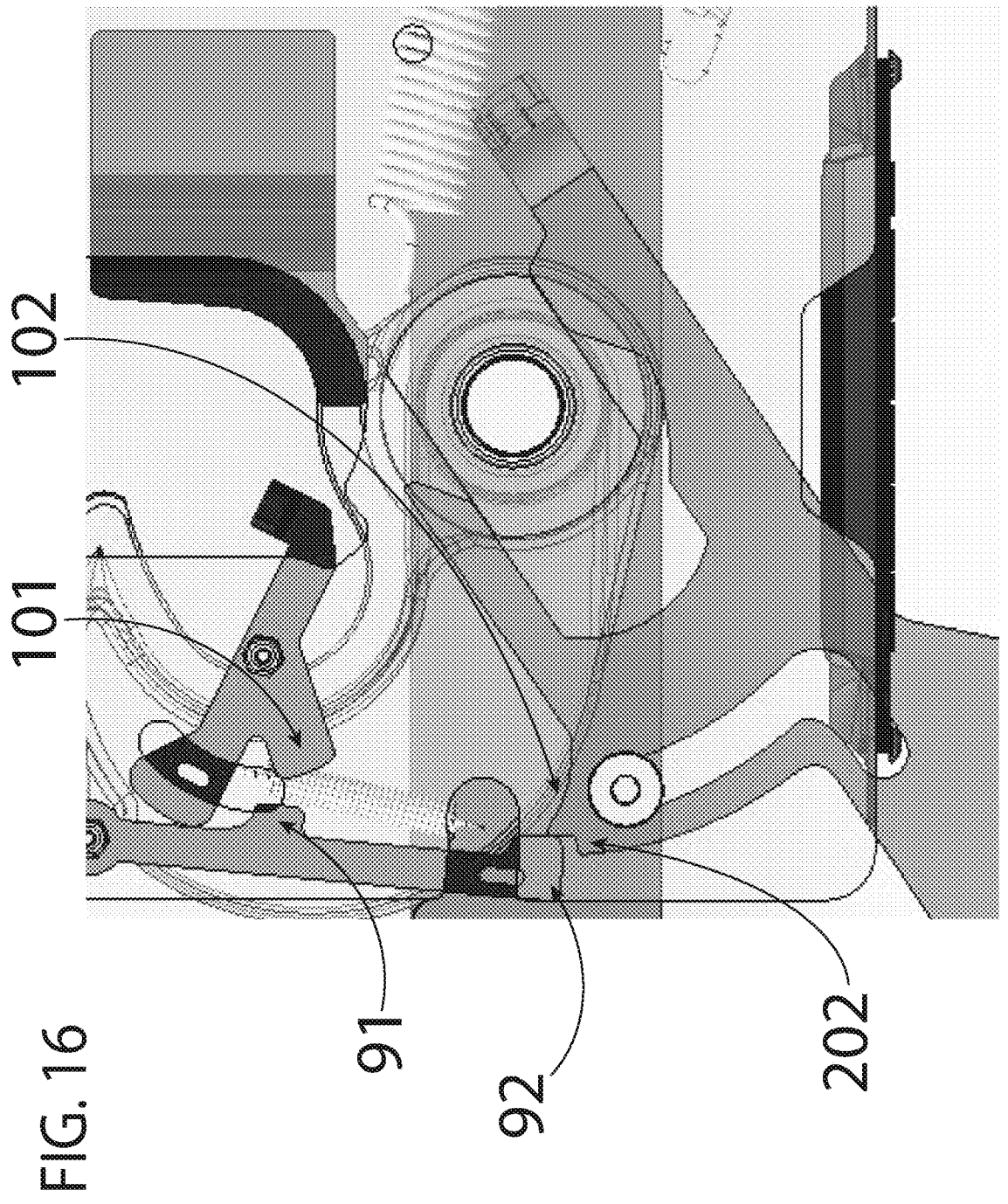
FIG. 16 is an enlarged view of the kingpin detector member, the handle lockout member, and the engagement handle when the fifth wheel hitch system is in an unhitched/unlocked position, according to some embodiments of the present disclosure.

FIG. 16 illustrates the system in an unhitched or open configuration. The engagement handle 48 may be pulled outward and rotated forward along the guide slot 56, causing the jaw 28 to rotate about the pivot pin 36 into an open position against the bias of the jaw biasing member 40. During this movement, the handle lockout member 62 may rotate relative to the handle 48 so that a retention portion 97 of the lockout member 62 may be biased into a notch 202 formed in the engagement handle 48. Engagement between the retention portion 97 and the notch 202 may temporarily hold the handle 48 in the outward, unhitched position, keeping the jaw 28 clear of the throat portion 12. In this unhitched configuration, the handle lockout protrusion 91 of the handle lockout member 62 may be displaced away from the detector member protrusion 101 of the kingpin detector member 64, allowing both components to move freely.

Figure 17:
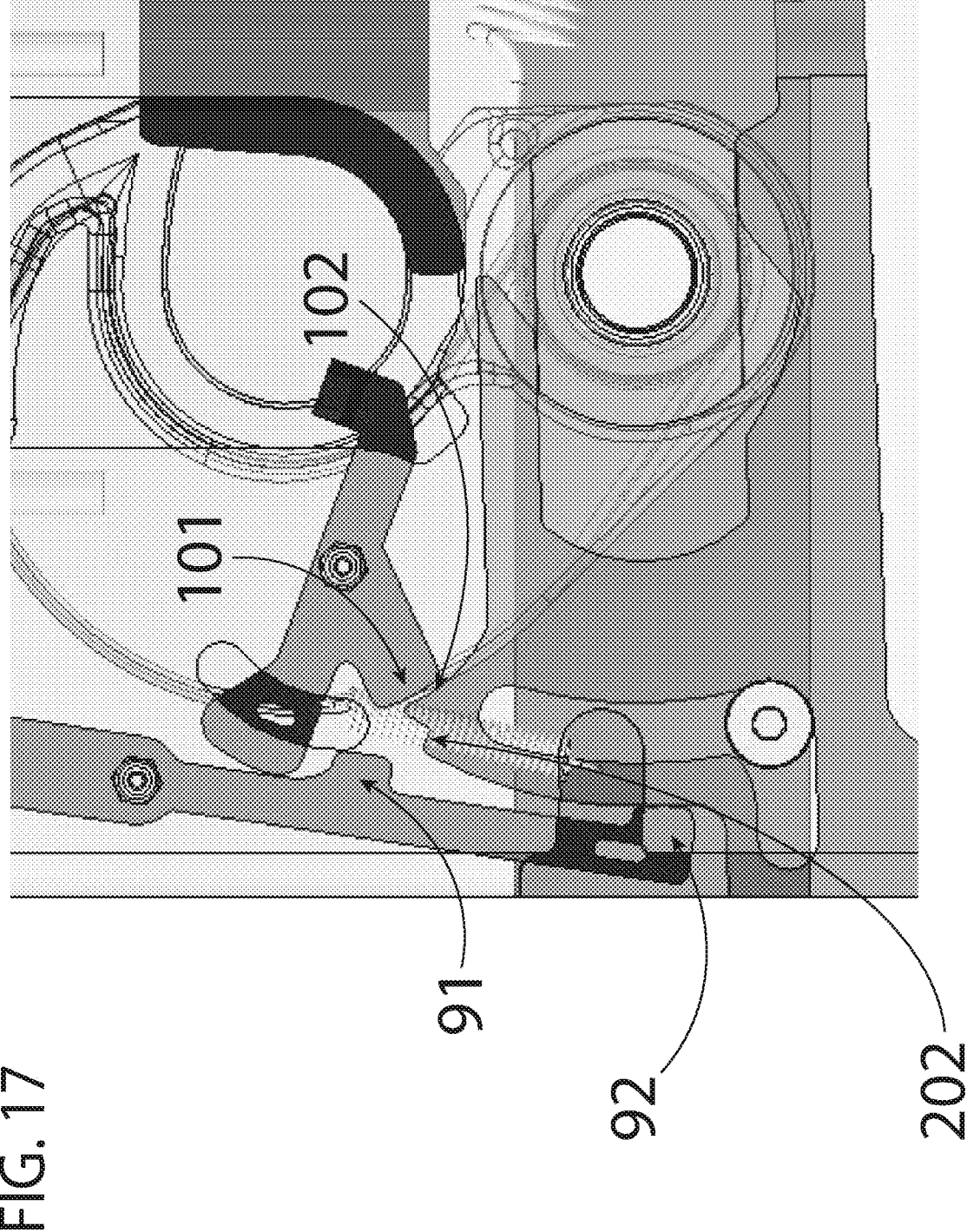
FIG. 17 is an enlarged view of the kingpin detector member, the handle lockout member, and the engagement handle when the fifth wheel hitch system is in an unlocked position such that the fifth wheel hitch system is able to receive a kingpin, according to some embodiments of the present disclosure.

As shown in FIG. 17, the system may be in a ready-to-receive configuration, allowing a new kingpin to enter the throat portion 12. In this state, the engagement handle 48 may remain pulled outward, with the retention portion 97 of the handle lockout member 62 still seated within the notch 202 of the handle 48 to hold the jaw 28 open. The kingpin detector member 64 may be positioned such that detector member protrusion 101 does not interfere with throat portion 12, leaving a clear path for kingpin entry. As the kingpin is inserted, the kingpin may contact the engagement portion 72 of the kingpin detector member 64, rotating the detector member 64 and shifting the detector member protrusion 101 away from the handle lockout protrusion 91 of the lockout member 62. This motion may release the lockout member 62, allowing the retention portion 97 to disengage from the notch 202 of the handle 48. Once released, the handle 48 may move inward under the influence of the handle biasing spring 60, and the jaw biasing member 40 may rotate the jaw 28 about the pivot pin 36 into the closed position that secures the kingpin. When fully locked, the guiding surface 102 of the handle 48 may again contact the detector member protrusion 101 of the detector member 64 to prevent reopening.

Further, the various embodiments may be combined to be utilized on a single fifth wheel hitch system operatively coupled with the towing vehicle. Any combination of the embodiments disclosed above is contemplated to be utilized together. For the sake of brevity, not every combination is described in detail, but all such combinations are contemplated by this disclosure. Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

COMPONENTS

| Components | |
| --- | --- |
| Ref No. | Component Name |
| 4 | Fifth wheel hitch system |
| 8 | Skid plate cover |
| 10 | System (alt. numbering) |
| 12 | Throat portion |
| 16 | Engagement assembly |
| 20 | Indicator system |
| 28 | Jaw |
| 32 | Head |
| 36 | Pivot pin (jaw) |
| 40 | Jaw biasing member |
| 44 | Kingpin guiding member |

-continued

| Components | |
| --- | --- |
| Ref No. | Component Name |
| 48 | Handle/Engagement handle |
| 52 | Guide bolt |
| 56 | Guide slot (in handle) |
| 60 | Handle biasing member/spring |
| 62 | Handle lockout member |
| 63 | Lockout pivot pin |
| 64 | Kingpin detector member |
| 68 | Arm (of detector member) |
| 72 | Engagement portion (detector) |
| 76 | Biasing member (detector lockout) |
| 81 | Guide slot position (locked) |
| 82 | Guide slot position (transition) |
| 83 | Guide slot position (uncoupling range) |
| 84 | Window |
| 88 | Second arm/second portion |
| 91 | Handle lockout protrusion |
| 92 | Indicator biasing member |
| 96 | Indicator arm |
| 97 | Retention portion (lockout) |
| 101 | Detector member protrusion |
| 102 | Guiding surface (handle) |
| 104 | Fifth wheel hitch system (alt. embodiment) |
| 112 | Throat portion (alt. embodiment) |
| 116 | Engagement assembly (alt.) |
| 124 | Kingpin guiding member (alt.) |
| 128 | First flange portion |
| 132 | Second flange portion |
| 136 | Kingpin |
| 140 | Longitudinal portion |
| 144 | Hitch funnel |
| 148 | Jaw (alt. embodiment) |
| 152 | Mounting bracket |
| 156 | Skid plate |
| 160 | First outer surface (kingpin) |
| 164 | Second outer surface (kingpin) |
| 168 | Curved flange portion |
| 172 | Leading edge (guiding member) |
| 172 | Leading edge (duplicate) |
| 180 | Kingpin latching assembly |
| 184 | Jaw (latching assembly) |
| 188 | Engagement handle (latching assembly) |
| 192 | Kingpin detector member (latching assembly) |
| 196 | Mounting platform |
| 200 | Pivot pin (detector 192) |
| 202 | Handle notch |
| 204 | Kingpin detecting end |
| 208 | Handle engaging end |
| 210 | Intermediate pivot point (detector) |
| 212 | Angled face (jaw) |
| 800 | Fifth wheel hitch system (alt. embodiment) |
| 805 | Indicator system (alt.) |
| 810 | Indicator face |
| 820 | Arm (indicator embodiment) |
| 830 | Throat (indicator embodiment) |
| 835 | Engagement portion (arm 820) |
| 840 | Bottom portion (mounting area) |
| 845 | Pivot point (arm 820) |
| 850 | Indicator arm |
| 855 | Indicator pivot point |
| 860 | Biasing spring (indicator arm) |
| 865 | Biasing spring (arm 820) |

What is claimed is:

1. A fifth wheel hitch system comprising:

a head defining a throat portion, wherein the throat portion is configured to receive a kingpin;

a jaw pivotally mounted about a pivot pin to securer a kingpin, thereby being rotatable between a closed position and an open position, a jaw biasing member operatively coupled to the jaw and configured to apply a bias to the jaw towards the closed position, wherein the jaw biasing member is configured to bias the jaw to the closed position, thereby locking the kingpin subsequent to the kingpin being received by the throat portion;

a kingpin detector member comprising an engagement portion configured to contact the kingpin, thereby rotating the kingpin detector member such that the engagement portion is displaced from the throat portion as the kingpin is received by the throat portion;

a handle lockout member operatively engaged with the kingpin detector member via a biasing member; and an engagement handle defining a guide slot, wherein, upon displacement of the engagement portion of the kingpin detector member, the handle lockout member is configured to disengage the engagement handle, thereby freeing the engagement handle to move along a path defined by the guide slot.

2. The fifth wheel hitch system of claim 1, wherein the jaw is configured to, upon being contacted by the kingpin, rotate to the open position against the bias of the jaw biasing member to receive the kingpin.

3. The fifth wheel hitch system of claim 1, wherein the handle lockout member is configured to disengage the engagement handle, thereby freeing the engagement handle to move along a path defined by the guide slot.

4. The fifth wheel hitch system of claim 1, further comprising an indicator system comprising an indicator face having two sensor states.

5. The fifth wheel hitch system of claim 4, wherein a first of the two sensor states comprises a locked position, wherein the locked position is configured to indicate that the jaw is in the closed position, thereby securing the jaw in the throat portion, and wherein a second of the two sensor states comprises an unlocked position, and wherein the unlocked position is configured to indicate that the kingpin is able to be received or removed from the throat portion.

6. The fifth wheel hitch system of claim 4, wherein the indicator system is coupled with an indicator biasing member that is configured to bias the indicator face to an unlocked position that corresponds to when the kingpin detector member is not displaced from the throat position by the kingpin.

7. A fifth wheel hitch system comprising:

a head defining a throat portion, wherein the throat portion is configured to receive a kingpin;

a jaw pivotally mounted about a pivot pin to secure the kingpin, thereby being rotatable between a closed position and an open position, a kingpin detector member comprising an engagement portion configured to contact the kingpin, thereby rotating the kingpin detector member such that the engagement portion is displaced from the throat portion as the kingpin is received by the throat portion;

a handle lockout member operatively engaged with the kingpin detector member via a biasing member; and an engagement handle defining a guide slot, wherein, upon displacement of the engagement portion of the kingpin detector member, the handle lockout member is configured to disengage the engagement handle, thereby freeing the engagement handle to move along a path defined by the guide slot.

8. The fifth wheel hitch system of claim 7, further comprising a guide bolt received in the guide slot, the guide bolt configured to constrain motion of the engagement handle along a path defined by the guide slot.

9. The fifth wheel hitch system of claim 7, wherein the guide slot comprises a first segment corresponding to an uncoupling range and a second segment corresponding to a coupling range, the segments being contoured to sequence movement of the engagement handle relative to rotation of the jaw.

10. The fifth wheel hitch system of claim 9, wherein the first segment and the second segment intersect to sequentially guide the engagement handle outward and to provide rotational movement of the engagement handle.

11. The fifth wheel hitch system of claim 7, wherein the guide slot includes a closed end defining a hard stop that limits travel of the engagement handle in an open position and prevents over-travel of the jaw.

12. The fifth wheel hitch system of claim 7, wherein a jaw biasing member is operatively coupled to the jaw, thereby applying a bias to the jaw towards the closed position;

wherein the jaw is configured to, upon being contacted by the kingpin, rotate to the open position against the bias of the jaw biasing member to receive the kingpin, and wherein the jaw biasing member is configured to bias the jaw to the closed position, thereby locking the kingpin subsequent to the kingpin being received by the throat portion.

13. The fifth wheel hitch system of claim 7, further comprising an indicator system comprising an indicator face having two sensor states comprising a locked position and an unlocked position.

14. The fifth wheel hitch system of claim 13, wherein the locked position is configured to indicate that the jaw is in the closed position, thereby securing the jaw in the throat portion, and wherein the unlocked position is configured to indicate that the kingpin is able to be received or removed from the throat portion.

15. The fifth wheel hitch system of claim 7, wherein the indicator system is coupled with an indicator biasing member that is configured to bias the indicator face to the unlocked position when the kingpin detector member is not displaced from the throat position by the kingpin.

16. A fifth wheel hitch system comprising:

a head defining a throat portion, wherein the throat portion is configured to receive a kingpin;

a jaw pivotally mounted about a pivot pin to secure the kingpin, thereby being rotatable between a closed position and an open position;

a jaw biasing member operatively coupled to the jaw and configured to apply a bias to the jaw towards the closed position;

wherein the jaw is configured to, upon being contacted by the kingpin, rotate to the open position against the bias of the jaw biasing member to receive the kingpin, and wherein the jaw biasing member is configured to bias the jaw to the closed position, thereby locking the kingpin subsequent to the kingpin being received by the throat portion;

a kingpin detector member comprising an engagement portion configured to contact the kingpin, thereby rotating the kingpin detector member such that the engagement portion is displaced from the throat portion as the kingpin is received by the throat portion;

a handle lockout member operatively engaged with the kingpin detector member via a biasing member;

an engagement handle defining a guide slot, wherein, upon displacement of the engagement portion of the kingpin detector member, the handle lockout member is configured to disengage the engagement handle, thereby freeing the engagement handle to move along a path defined by the guide slot.

17. The fifth wheel hitch system of claim 16, wherein the handle lockout member is rotatable between an engaged position and a disengaged position such that, in the engaged position, the handle lockout member engages the engagement handle in a defined position to prevent rotation, pivoting, or movement of the engagement handle.

18. The fifth wheel hitch system of claim 16, wherein the handle lockout member is configured to hold the engagement handle in a rotated position corresponding to the jaw being maintained clear of the throat portion, whereby disengagement of the handle lockout member releases the engagement handle to allow the jaw to rotate toward the closed position under the bias of the jaw biasing member.

19. The fifth wheel hitch system of claim 16, wherein the handle lockout member comprises a retention portion positioned to engage a complementary surface of the engagement handle when the engagement handle is in a rotated position corresponding to the jaw being held open.

20. The fifth wheel hitch system of claim 16, wherein the handle lockout member, when holding the engagement handle in the rotated position, prevents rotation of the jaw toward the closed position so that the kingpin is able to uncouple or to be removed from the throat portion.

\* \* \* \* \*